United States Patent
Ono

(10) Patent No.: US 9,470,875 B2
(45) Date of Patent: Oct. 18, 2016

(54) IMAGE PICKUP DEVICE

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/820,862

(22) Filed: Aug. 7, 2015

(65) Prior Publication Data

US 2015/0338606 A1 Nov. 26, 2015

Related U.S. Application Data

(63) Continuation of application No. PCT/JP2014/050116, filed on Jan. 8, 2014.

(30) Foreign Application Priority Data

Feb. 21, 2013 (JP) ................. 2013-032100

(51) Int. Cl.
*G02B 13/00* (2006.01)
*H04N 5/378* (2011.01)
(Continued)

(52) U.S. Cl.
CPC ......... *G02B 13/0015* (2013.01); *G02B 3/0037* (2013.01); *G02B 13/02* (2013.01); *G02B 13/04* (2013.01); *G02B 15/00* (2013.01); *G02B 17/0808* (2013.01); *G03B 15/00* (2013.01);
(Continued)

(58) Field of Classification Search
CPC ............ G02B 13/0015; G02B 3/0037; G02B 17/0808; G02B 13/04; G02B 13/02; G02B 15/00; H04N 5/3696; H04N 5/2254; H04N 5/378; H04N 5/2259; H04N 5/2353; H04N 5/232; H04N 5/2351; G03B 15/00

See application file for complete search history.

(56) References Cited

U.S. PATENT DOCUMENTS 6,351,335 B1   2/2002  Perlin
9,071,828 B2   6/2015  Ono
(Continued)

FOREIGN PATENT DOCUMENTS

JP   2006-345056   12/2006
JP   2009-122379    6/2009
(Continued)

OTHER PUBLICATIONS

Extended European Search Report dated Oct. 23, 2015; Application No. 14754531.3.

(Continued)

*Primary Examiner* — Twyler Haskins
*Assistant Examiner* — Padma Haliyur
(74) *Attorney, Agent, or Firm* — Young & Thompson

(57) ABSTRACT

An image pickup device includes a photographing optical system having a central optical system disposed at a central region and a circular optical system disposed at an outer portion of the central optical system which are arranged along the same optical axis, a directional sensor having plural pixels including two-dimensionally arranged photoelectric conversion elements, the directional sensor including plural pixels for selectively receiving light beams of light fluxes which are incident via the central optical system and the circular optical system by applying pupil division, an image readout device that acquires from the directional sensor each of an image signal representing a first image received via the central optical system and an image signal representing a second image received via the circular optical system.

13 Claims, 18 Drawing Sheets

(51) Int. Cl.

| | |
|---|---|
| *G02B 3/00* | (2006.01) |
| *H04N 5/225* | (2006.01) |
| *G02B 13/02* | (2006.01) |
| *G02B 13/04* | (2006.01) |
| *G02B 15/00* | (2006.01) |
| *G02B 17/08* | (2006.01) |
| *G03B 15/00* | (2006.01) |
| *H04N 5/232* | (2006.01) |
| *H04N 5/235* | (2006.01) |
| *H04N 5/369* | (2011.01) |
| *G02B 13/18* | (2006.01) |

(52) U.S. Cl.
CPC .......... *H04N 5/2254* (2013.01); *H04N 5/2259* (2013.01); *H04N 5/232* (2013.01); *H04N 5/2351* (2013.01); *H04N 5/2353* (2013.01); *H04N 5/3696* (2013.01); *H04N 5/378* (2013.01); *G02B 13/18* (2013.01)

(56) References Cited

U.S. PATENT DOCUMENTS

| | | | | |
|---|---|---|---|---|
| 9,207,433 | B2* | 12/2015 | Blayvas | ............... G02B 13/007 |
| 2006/0274170 | A1 | 12/2006 | Azuma | |
| 2009/0135502 | A1 | 5/2009 | Border et al. | |
| 2010/0045849 | A1 | 2/2010 | Yamasaki | |
| 2011/0234853 | A1* | 9/2011 | Hayashi | ................. G03B 13/02 |
| | | | | 348/231.99 |
| 2012/0081587 | A1* | 4/2012 | Ryu | ................... H01L 27/14627 |
| | | | | 348/302 |
| 2013/0083230 | A1* | 4/2013 | Fukuda | ............. H04N 5/35563 |
| | | | | 348/340 |
| 2014/0139645 | A1 | 5/2014 | Ono | |

FOREIGN PATENT DOCUMENTS

| | | |
|---|---|---|
| JP | 2010-271429 | 12/2010 |
| JP | 2011-505022 | 2/2011 |
| JP | 2012-088696 | 5/2012 |
| JP | 2012-253670 | 12/2012 |
| WO | 0062543 | 10/2000 |
| WO | 2013018471 | 2/2013 |

OTHER PUBLICATIONS

International Preliminary Report on Patentability, dated Aug. 27, 2015; Application No. PCT/JP2014/050116.

International Search Report, PCT/JP2014/050116, Feb. 10, 2014.

* cited by examiner

FIG.6
(a)
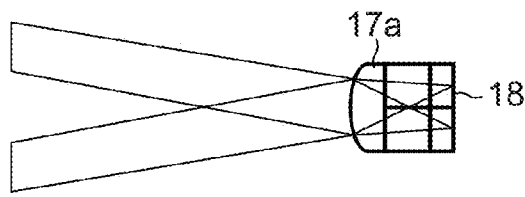
PUPIL IMAGE SEPARATION METHOD
(b)
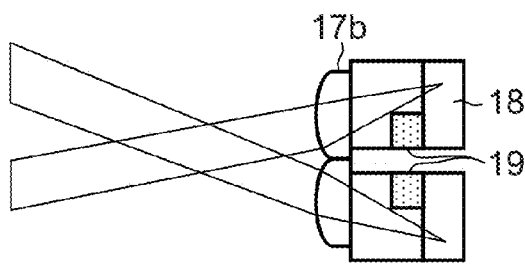
LIGHT SHIELDING MASK METHOD
FIG.7
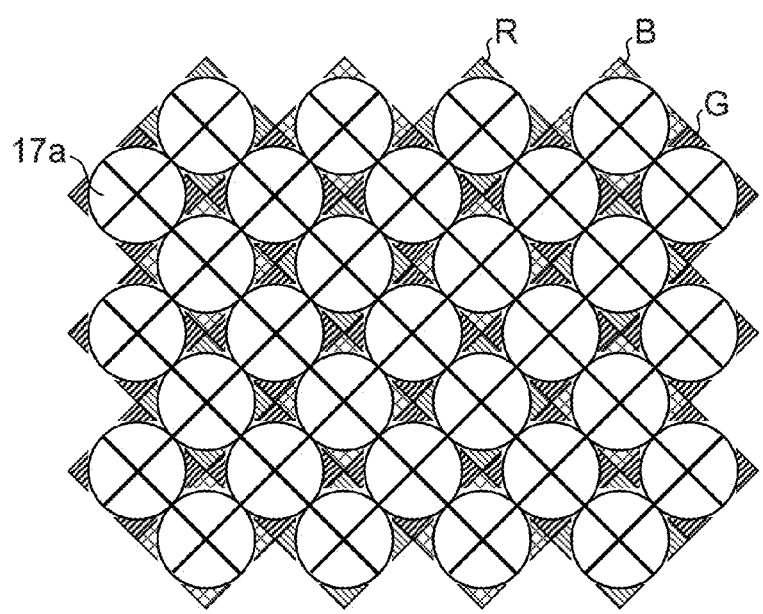

US 9,470,875 B2

IMAGE PICKUP DEVICE

CROSS-REFERENCE TO RELATED APPLICATIONS

This application is a Continuation of PCT International Application No. PCT/JP2014/050116 filed on Jan. 8, 2014, which claims priority under 35 U.S.C§119(a) to Japanese Patent Application No. 2013-32100 filed on Feb. 21, 2013. Each of the above application(s) is hereby expressly incorporated by reference, in its entirety, into the present application.

BACKGROUND OF THE INVENTION

1. Field of the Invention

The present invention relates to an image pickup device, and particularly relates to an image pickup device capable of simultaneously acquiring a wide angle image and a telephoto image.

2. Description of the Related Art

In the past, there has been proposed a dual focal length optical system in which a wide angle lens is disposed at a central region and an annular telephoto lens is disposed at an outer portion of the wide angle lens along the same optical axis (FIG. 1 in PTL 1: National Publication of International Patent Application No. 2011-505022). The annular telephoto lens of this optical system has a reflective mirror type lens configuration including two reflective mirrors, which provides a compact configuration of a telephoto lens having a long a focal length. Image formed positions of the wide angle lens and telephoto lens in this optical system are designed to be at the positions different from each other in the optical axis direction, and image pickup elements are separately disposed at the respective image formed positions.

There has been proposed an optical device which includes a wide angle objective optical system, a telephoto objective optical system, and a common optical system through which a light ray having passed through either of the objective optical systems passes through in common, and has a reflective member selectively introducing any of subject light beams taken in by the plural objective optical systems into the common optical system (PTL 2: Japanese Patent Application Laid-Open No. 2009-122379).

Then, the reflective member is made movable so as to introduce the subject light taken in by the objective optical system that is any one of the wide angle objective optical system and the telephoto objective optical system into a common image pickup element via the common optical system.

There has been proposed an image pickup device in which subject light beams passing through different regions on an imaging lens are subjected to pupil separation and made incident on pixels on an image pickup element corresponding to the different regions on the imaging lens to simultaneously capture plural images corresponding to the subject light beams having been subjected to the pupil separation (PTL 3: Japanese Patent Application Laid-Open No. 2012-88696).

SUMMARY OF THE INVENTION

In the optical system disclosed in PTL 1, the wide angle image and the telephoto image imaged respectively through the wide angle lens and the telephoto lens are acquired from the separate image pickup elements disposed at the positions different from each other in the optical axis direction, which causes a problem that the size reduction and cost reduction of the device are difficult.

In the optical device disclosed in PTL 2, the reflective member (reflective mirror) is made movable to select any one of the objective optical systems of the wide angle objective optical system and the telephoto objective optical system, which causes problems that the wide angle image and the telephoto image cannot be simultaneously imaged and that necessity of a mechanism for the movable reflective member results in size increase of the device.

In the image pickup device disclosed in PTL 3, it is possible that the subject light beams passing through different regions on the imaging lens are subjected to pupil separation to simultaneously capture plural images corresponding to the subject light beams having been subjected to the pupil separation by one image pickup element, but no concrete configuration for successfully capturing the wide angle image and the telephoto image is described in PTL 3.

The present invention has been made in consideration of such a circumstance, and has an object to provide an image pickup device which is capable of simultaneously acquiring a first image and a second image formed into images respectively by a central optical system and a circular optical system that share an optical axis, and is compact and inexpensive.

In order to achieve the above object, an image pickup device according to an aspect of the invention includes a photographing optical system having a central optical system disposed at a central region and a circular optical system disposed at an outer portion of the central optical system which are arranged along the same optical axis, a directional sensor having plural pixels including two-dimensionally arranged photoelectric conversion elements, the directional sensor including plural pixels for selectively receiving light beams of light fluxes which are incident via the central optical system and the circular optical system by applying pupil division, an image readout device that acquires from the directional sensor each of an image signal representing a first image received via the central optical system and an image signal representing a second image received via the circular optical system.

According to an aspect of the invention, combination of the photographing optical system having the central optical system and the circular optical system that share the optical axis, and the directional sensor including plural pixels for selectively receiving light beams of light fluxes which are incident via the central optical system and the circular optical system by applying pupil division allows the first image and the second image to be simultaneously acquired by one directional sensor. The central optical system and the circular optical system can improve quality of an image as compared with parallel type optical systems arranged with the optical axis being interposed therebetween.

In the image pickup device according to another aspect of the invention, it is preferable that the directional sensor having directional characteristics depending on pupil shapes of the central optical system and the circular optical system at an image surface position is used. This is because the pupil shapes of the central optical system and the circular optical system vary depending on the image surface position.

In the image pickup device according to still another aspect of the invention, it is preferable that the directional sensor has plural microlenses serving as a pupil division device, and the number and/or positions of pixels allocated to one microlens of the plural microlenses is the number and/or positions depending on pupil positions and shapes of the central optical system and the circular optical system. Specifically, variation of the pupil shapes of the central optical system and the circular optical system depending on the image surface position is coped with by optimizing the number and/or position of pixels allocated to one microlens.

In the image pickup device according to still another aspect of the invention, it is preferable that the directional sensor has a microlens serving as a pupil division device, the microlens dividing a pupil image and each divided pupil image entering the pixel, and the number of the pixels allocated to one microlens decreases as an image height increases. If the number of the pixels per one microlens is fixed, pupil separation is performed to allow the light to be incident on each pixel at the central region, but, at the outer portion (at a position of higher image height), the pixel is brought about where the light is unlikely to be incident or no light is incident (useless pixel). According to still another aspect of the invention, the number of the pixels allocated to one microlens decreases as the image height increases, which allows the light to be incident on the all pixels and the pixels in the directional sensor to be effectively used.

In the image pickup device according to still another aspect of the invention, it is preferable that a size of each pixel in the directional sensor is identical, and a size of the microlens used decreases as the image height increases. In other words, as the image height increases, the size of the microlens decreases, which decreases the number of the pixels per one microlens as the image height increases.

In the image pickup device according to still another aspect of the invention, it is preferable that a size of the microlens is identical, and a size of the pixel in the directional sensor increases as the image height increases. In other words, as the image height increases, the size of the pixel increases, which decreases the number of the pixels per one microlens as the image height increases.

In the image pickup device according to still another aspect of the invention, it is preferable that the central optical system has larger image forming magnification at the central region and smaller image forming magnification at a periphery side. In other words, the central optical system is made to have characteristics like a fisheye lens. By doing so, at a (central) region where sampling by the directional sensor becomes coarse due to the division of the first and second images, the image forming magnification of the central optical system is increased (image is enlarged) to make a resultant sampling density of an object space close to be uniform, improving quality of an image.

In the image pickup device according to still another aspect of the invention, it is preferable that the circular optical system has larger image forming magnification on an inner diameter side and smaller image forming magnification on an outer diameter side.

In the image pickup device according to still another aspect of the invention, it is preferable that the directional sensor has a light shielding mask serving as a pupil division device, and the light shielding mask having an opening shape depending on pupil shapes of the central optical system and the circular optical system at an image surface position is used.

In the image pickup device according to still another aspect of the invention, it is preferable that a first image circle for the central optical system is different from a second image circle for the circular optical system, and the directional sensor has the pixel for selectively receiving the light by applying the pupil division disposed at only a region where the first image circle and the second image circle overlap one another. This allows the pixels in the directional sensor to be effectively used.

In the image pickup device according to still another aspect of the invention, it is preferable that the central optical system has wider angle as compared with the circular optical system.

In the image pickup device according to still another aspect of the invention, it is preferable that the circular optical system has a catoptric system for reflecting the light flux two or more times. This allows a length of the circular optical system in an optical axis direction to be shortened, making the device compact.

In the image pickup device according to still another aspect of the invention, it is preferable that the directional sensor is positioned on an object side with respect to the catoptric system which first reflects the light flux. This makes it possible to arrange the directional sensor on an inner side of the photographing optical system, allowing a length of the device in the optical axis direction to be shortened.

In the image pickup device according to still another aspect of the invention, it is preferable that the central optical system and the circular optical system share a part of the optical system. This can make the device compact and reduce the cost.

The image pickup device according to still another aspect of the invention includes a mode switcher that switches between a first imaging mode and a second imaging mode different in a focal length from each other, in which the image readout device acquires from the directional sensor the image signal representing the first image obtained by receiving the light via the central optical system when the mode switcher switches to the first imaging mode, and acquires from the directional sensor the image signal representing the second image obtained by receiving the light via the circular optical system when the mode switcher switches to the second imaging mode. This makes it possible to selectively acquire the first image or the second image without mechanically switching.

In the image pickup device according to still another aspect of the invention, the mode switcher has a switching function to switch to a hybrid imaging mode for performing two kinds of imaging different in the focal length, and the image readout device simultaneously acquires from the directional sensor the image signal representing the first image obtained by receiving the light via the central optical system and the image signal representing the second image obtained by receiving the light via the circular optical system when the mode switcher switches to the hybrid imaging mode. This allows the first image and the second image to be simultaneously acquired.

According to the invention, combination of the photographing optical system having the central optical system and the circular optical system that share the optical axis, and the directional sensor makes is possible to simultaneously acquire the first image and the second image which are formed on an image formed surface of the directional sensor respectively via the central optical system and the circular optical system and by applying the pupil division. The optical system is not required to be mechanically switched when the first image and the second image are acquired, and the first image and the second image can be simultaneously acquired by one directional sensor, making the device compact and inexpensive.

(a) portion and (b) portion of FIG. 6 are schematic views showing a pupil image separation method and a light shielding mask method, respectively.

FIG. 7 is a main part plan view of a directional sensor of pupil image separation method.

Figure 8:
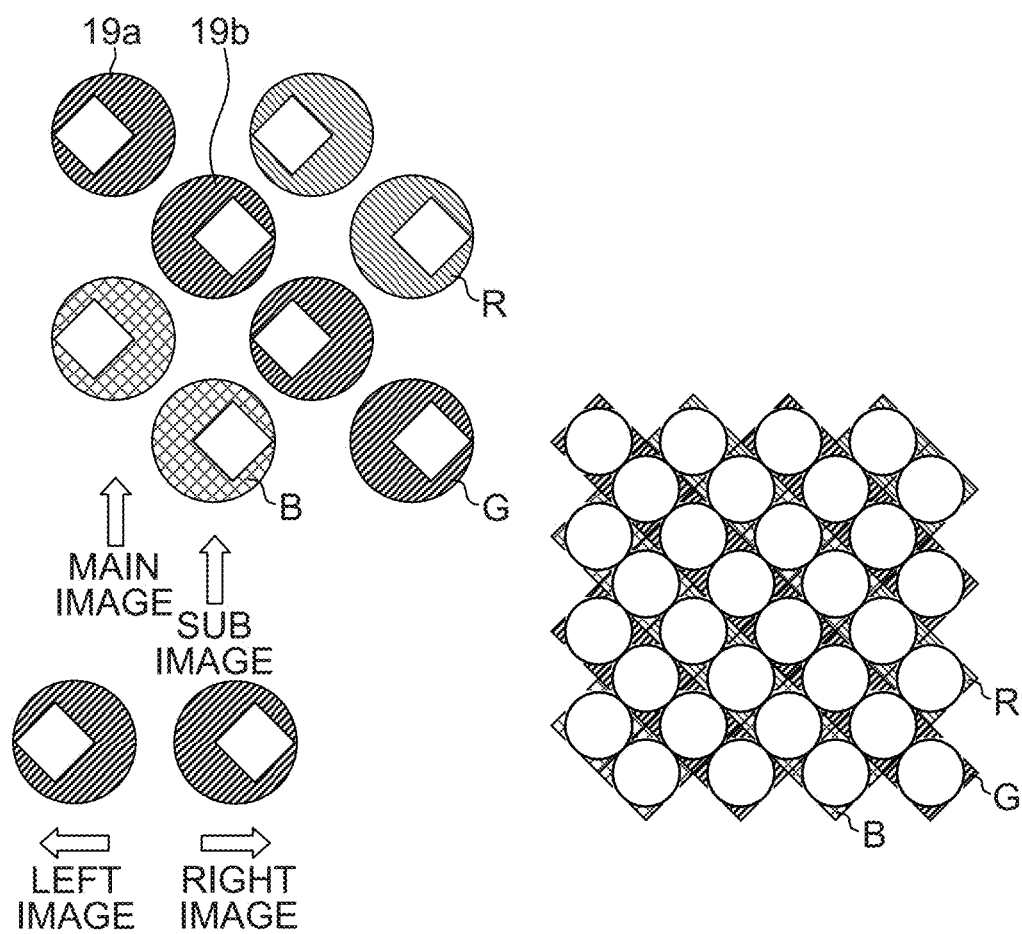

FIG. 8 is a main part plan view of a directional sensor of light shielding mask method.

Figure 9:
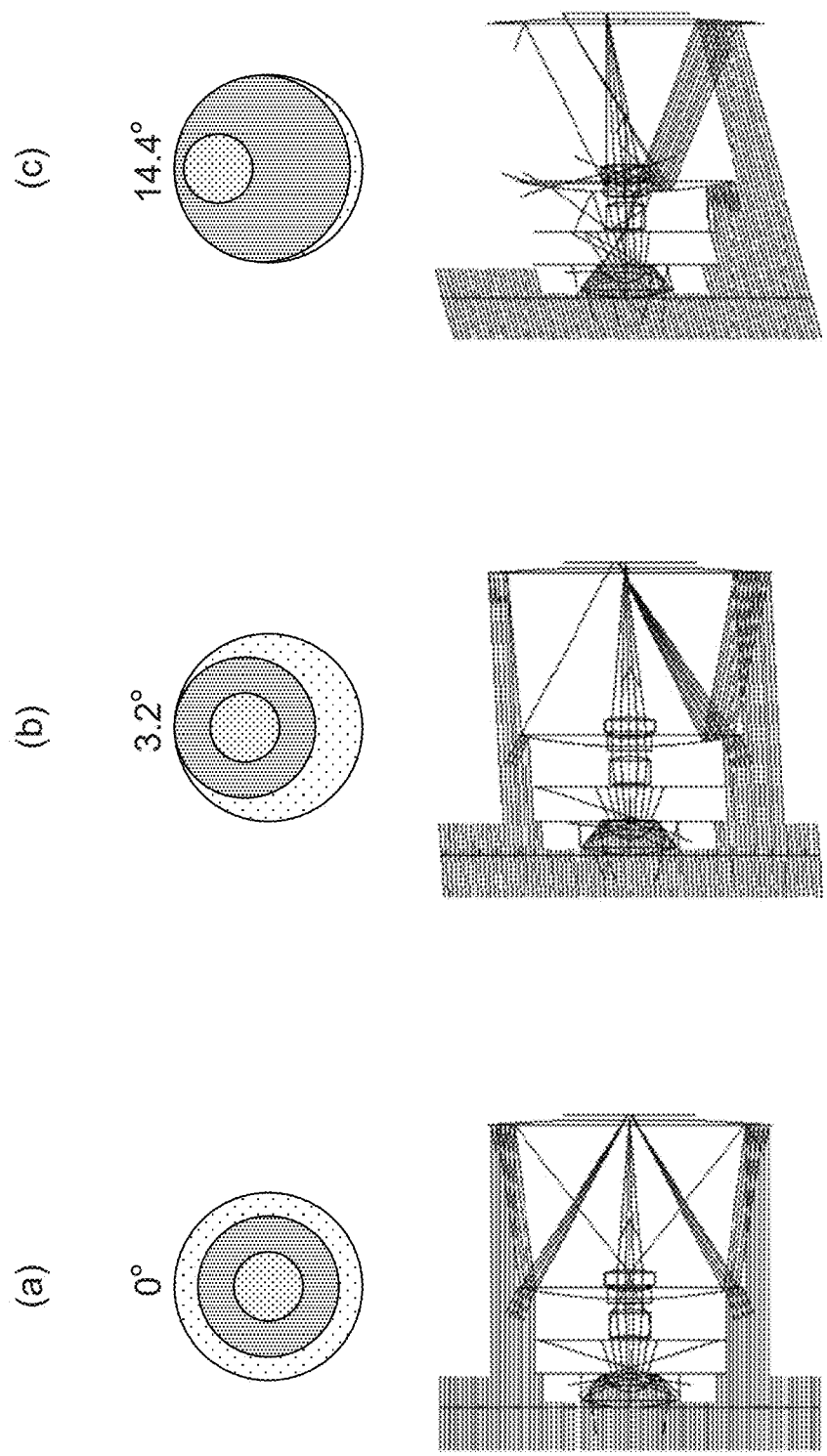

FIG. 9 is an illustration showing pupil shapes corresponding to the central optical system and the circular optical system, and showing tracking of light rays by incident direction of the light ray passing through the central optical system and the circular optical system.

Figure 10:
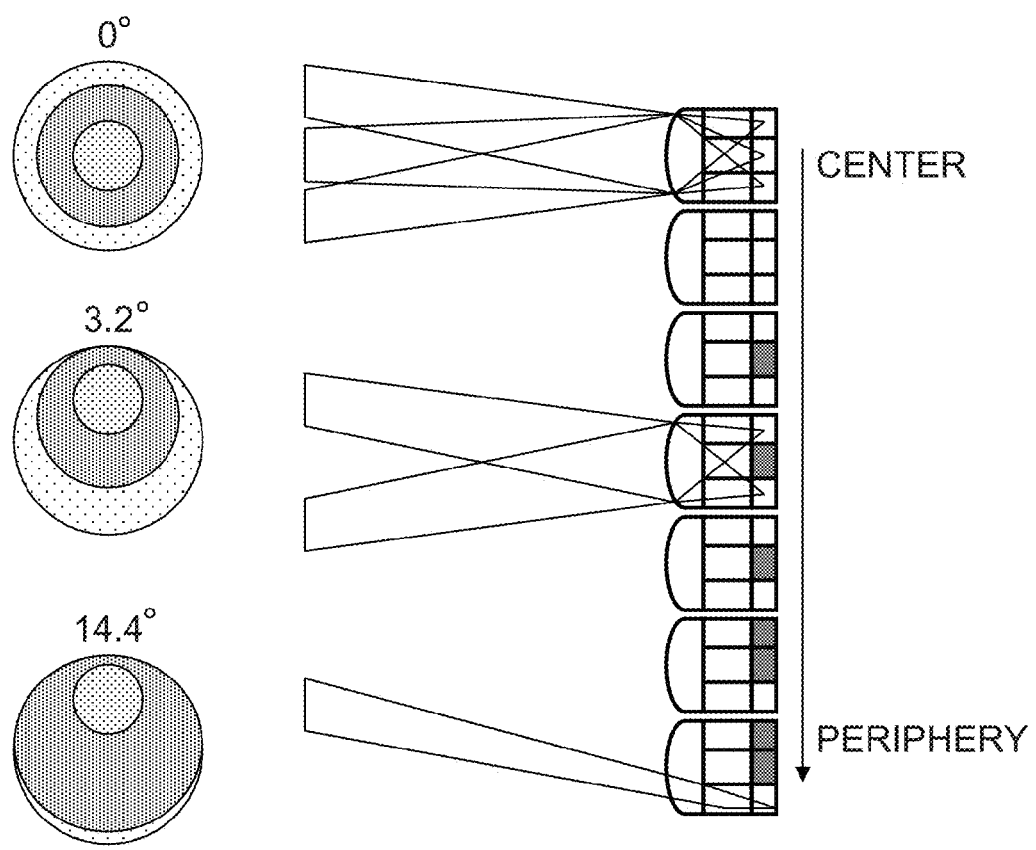

FIG. 10 is an illustration used for explaining optimization of the directional sensor of pupil image separation method.

Figure 11:
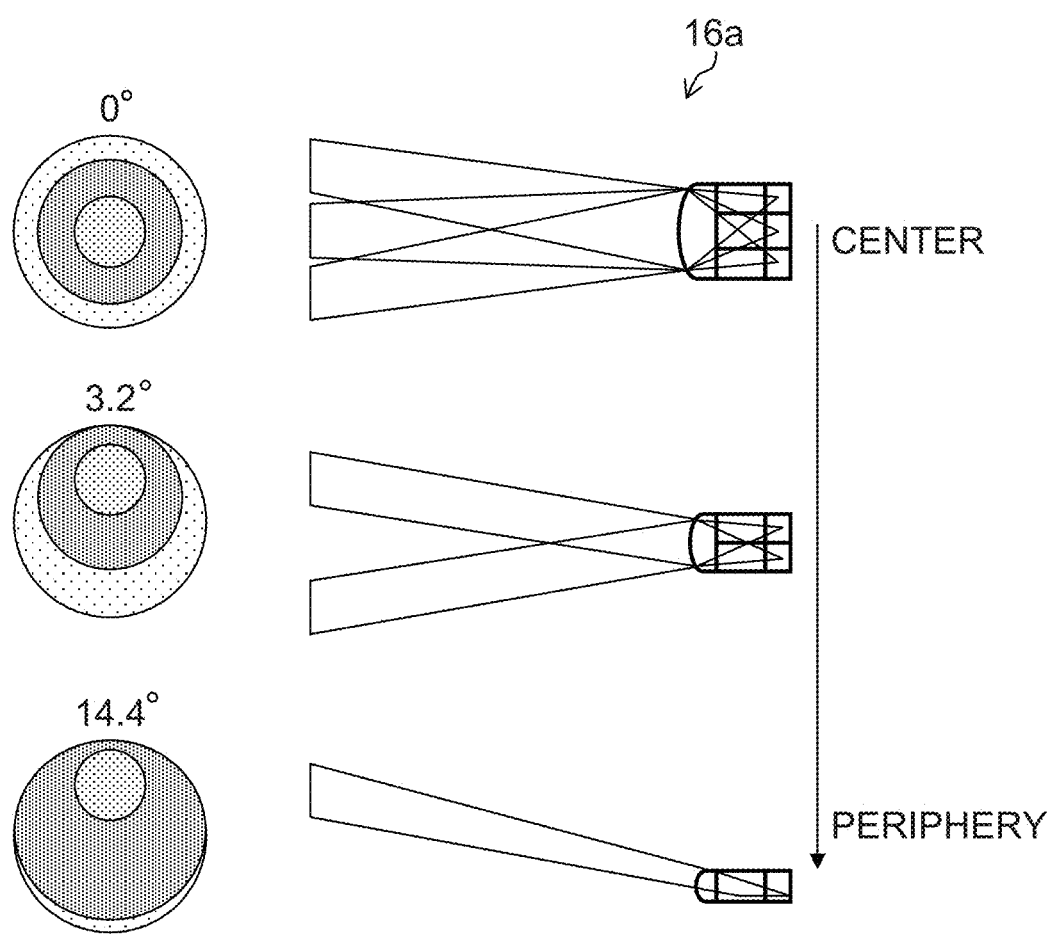

FIG. 11 is a main part sectional view of the optimized directional sensor of pupil image separation method.

Figure 12:
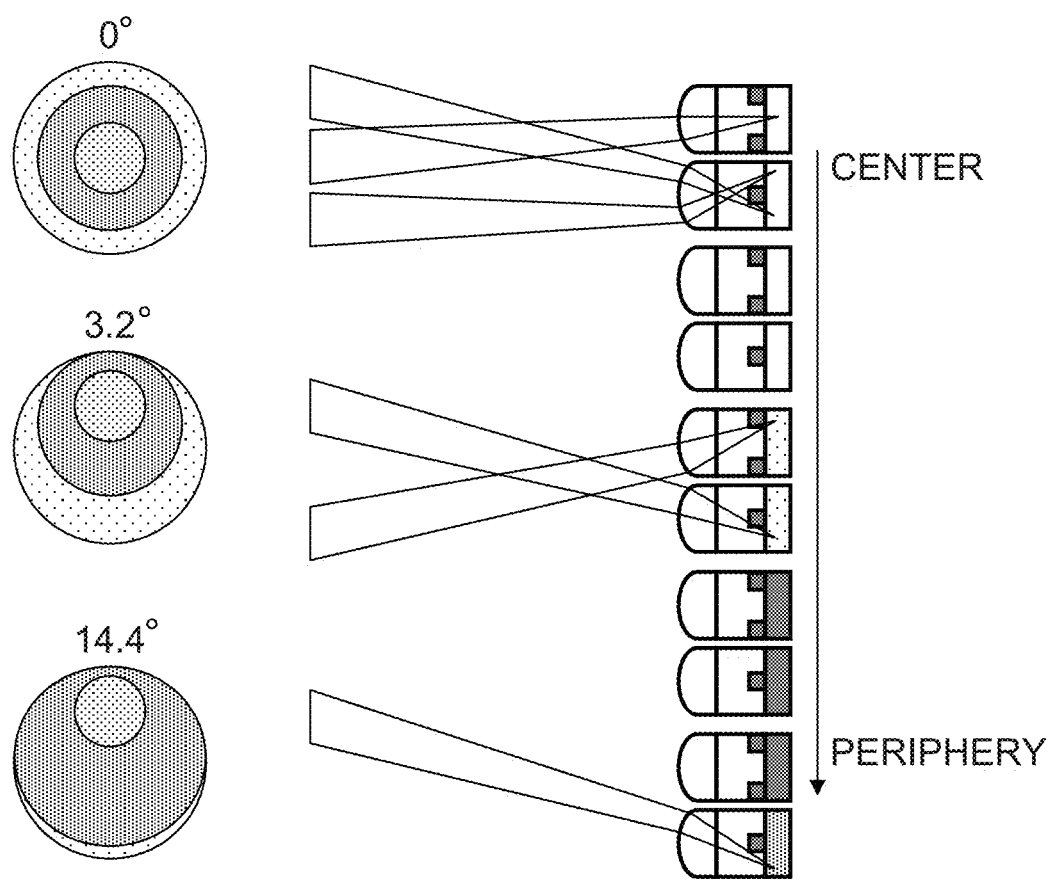

FIG. 12 is an illustration used for explaining optimization of the directional sensor of light shielding mask method.

Figure 13:
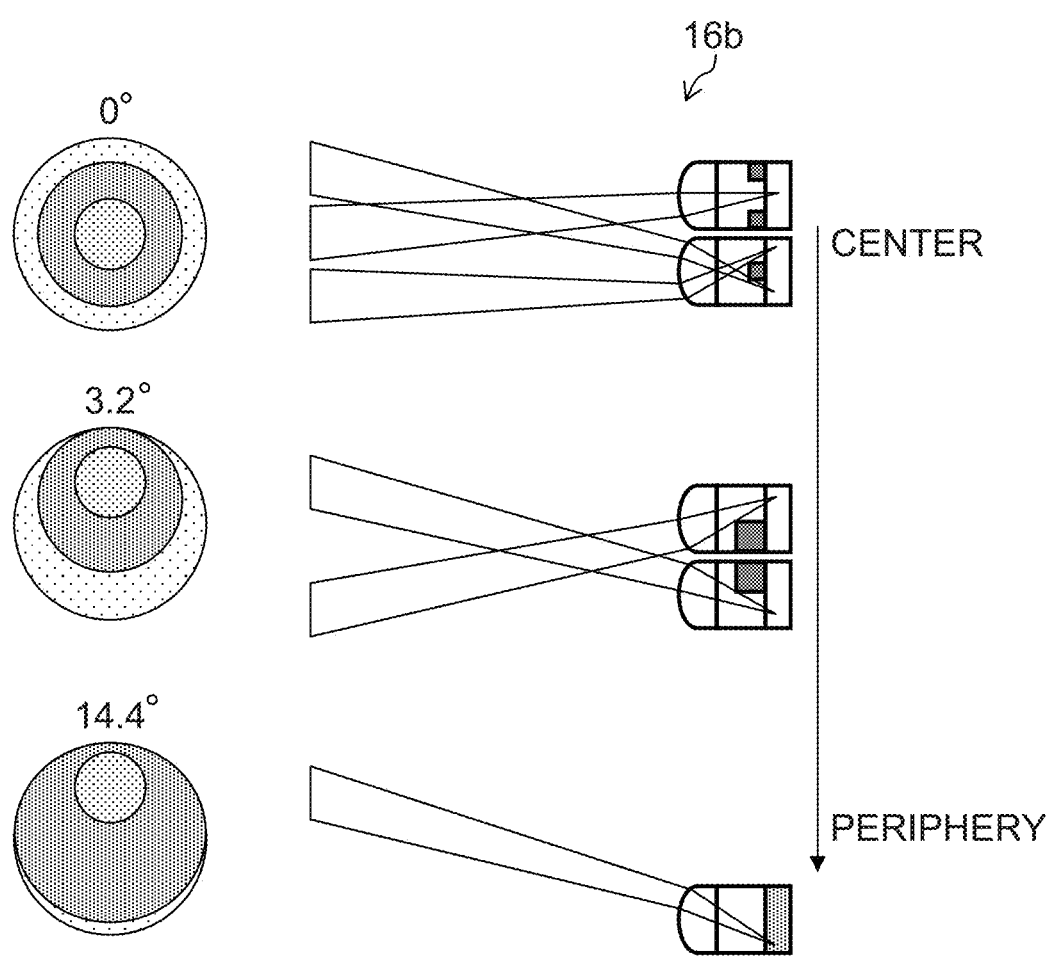

FIG. 13 is a main part sectional view of the optimized directional sensor of light shielding mask method.

Figure 14:
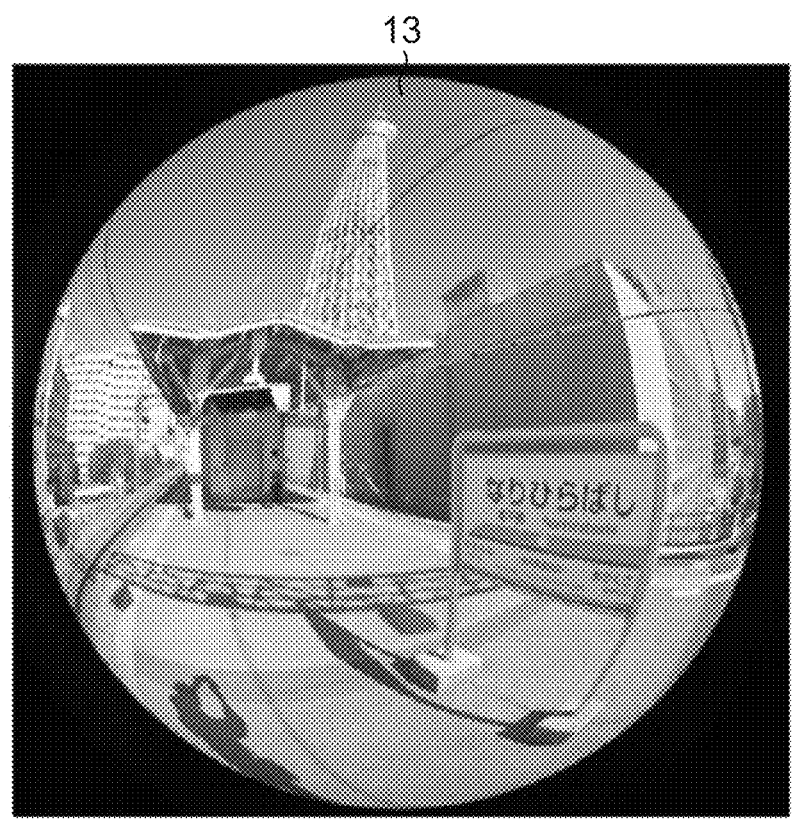

FIG. 14 is an illustration showing preferable image forming characteristics of the central optical system.

Figure 15:
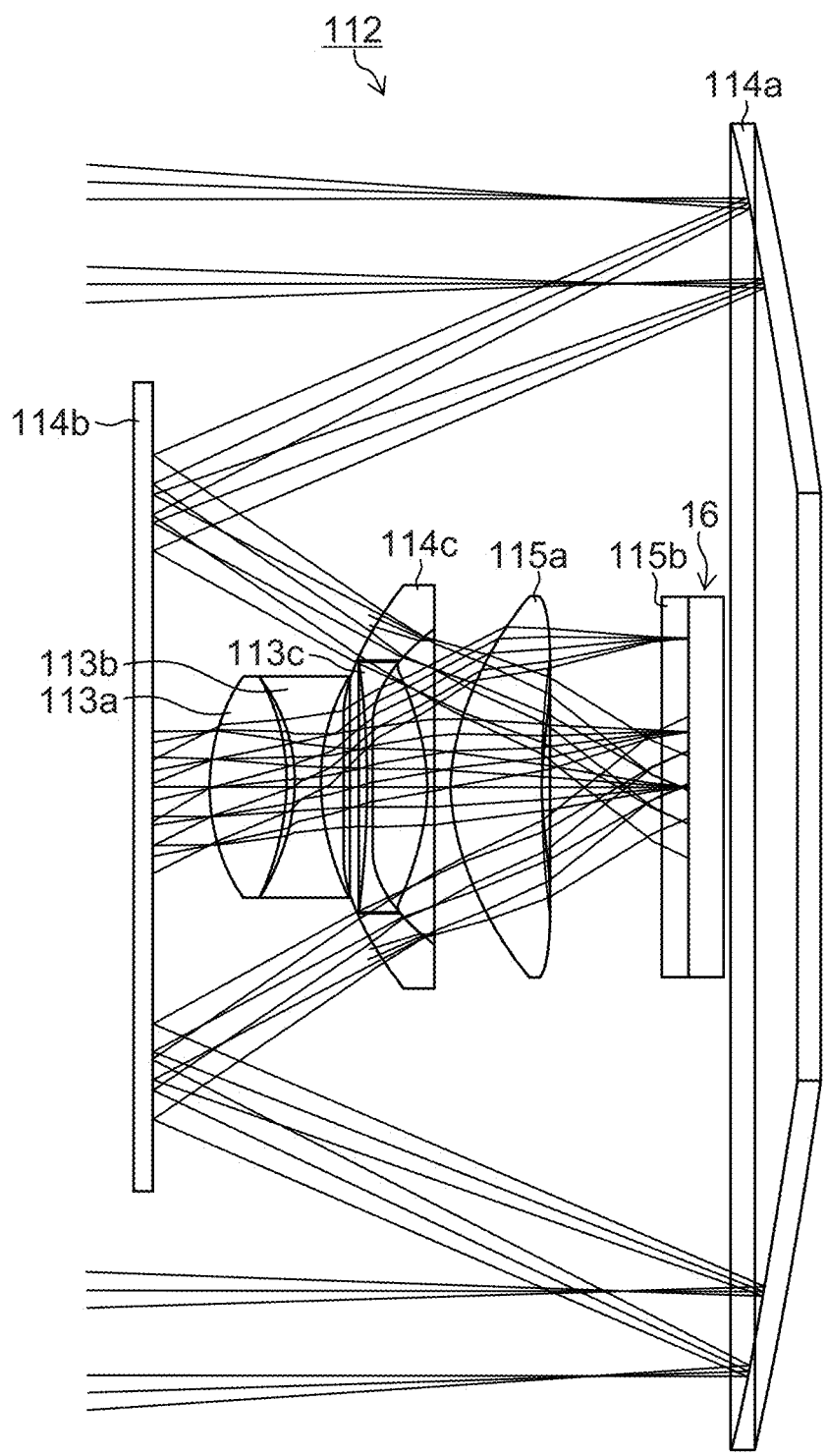

FIG. 15 is a sectional view showing a second embodiment of a photographing optical system.

Figure 16:
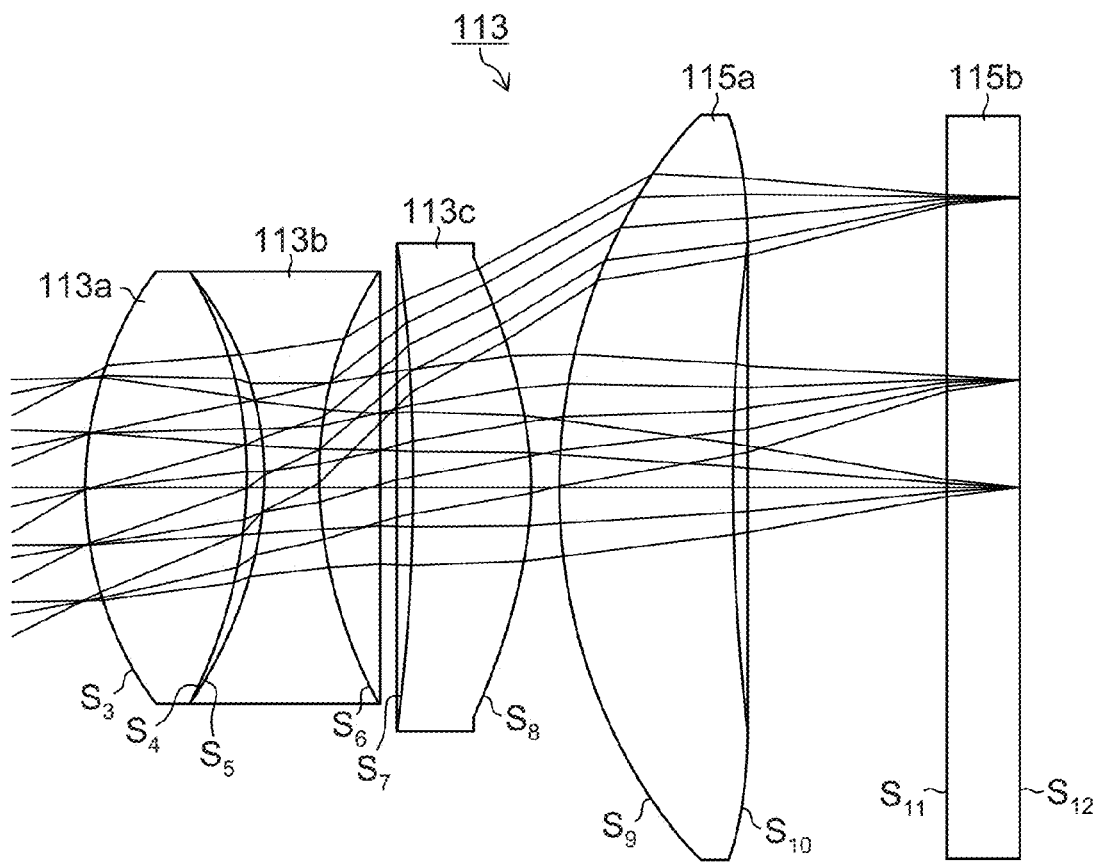

FIG. 16 is a sectional view showing a central optical system in the photographing optical system shown in FIG. 15.

Figure 17:
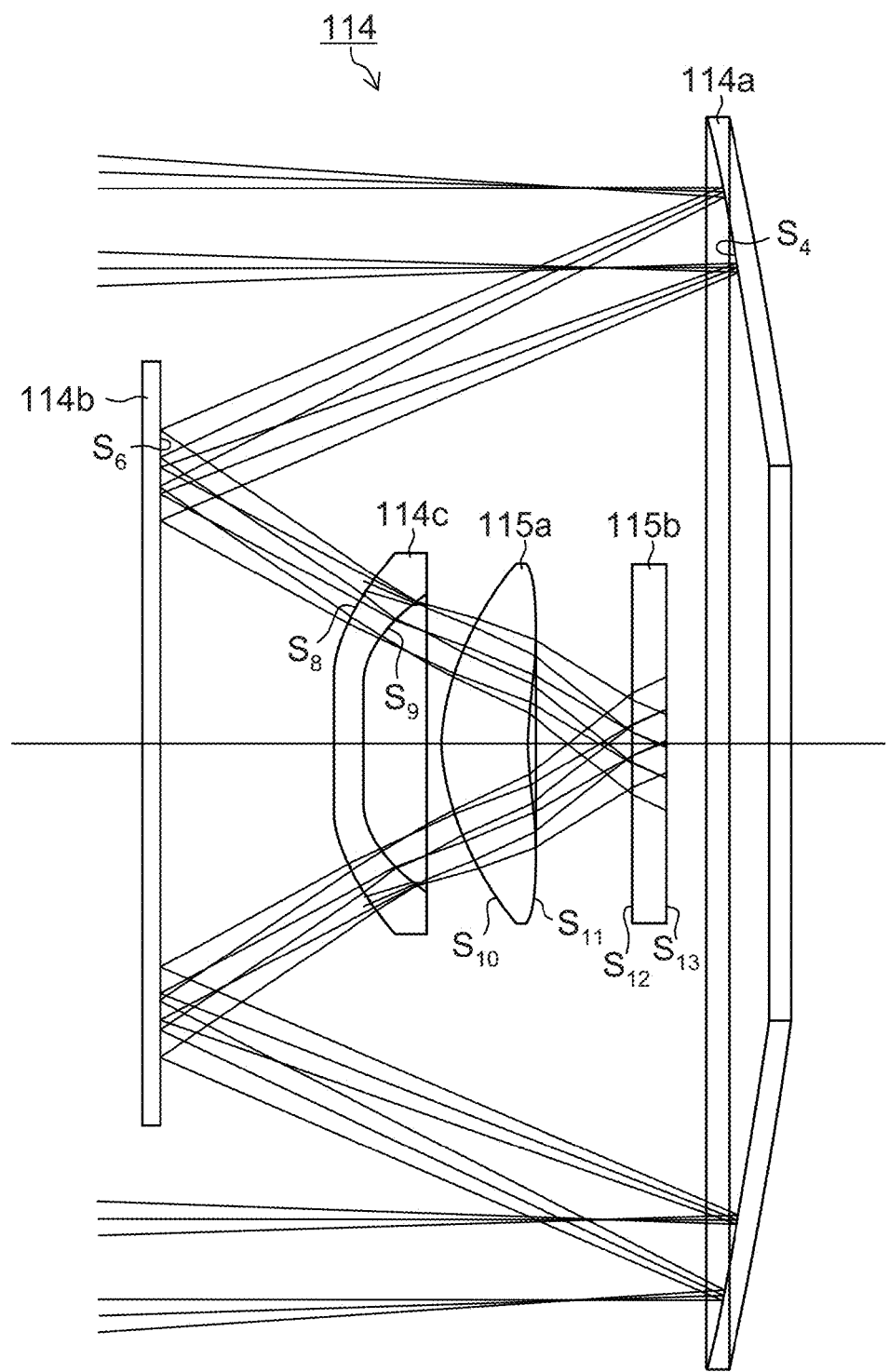

FIG. 17 is a sectional view showing a circular optical system in the photographing optical system shown in FIG. 15.

Figure 18:
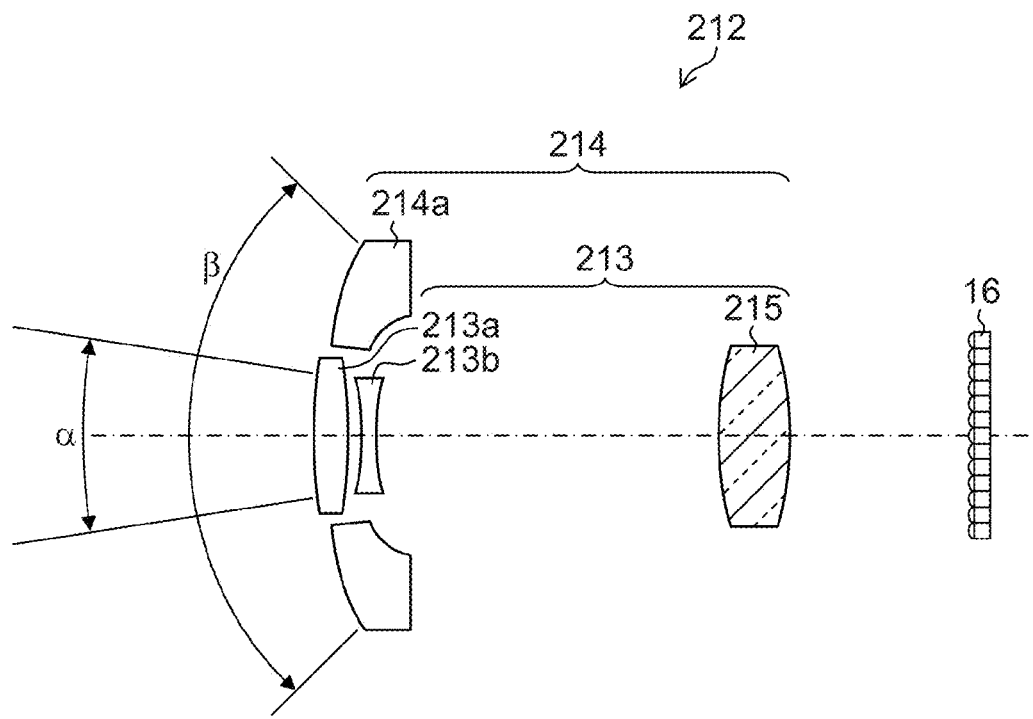

FIG. 18 is a sectional view showing a third embodiment of a photographing optical system.

Figure 19:
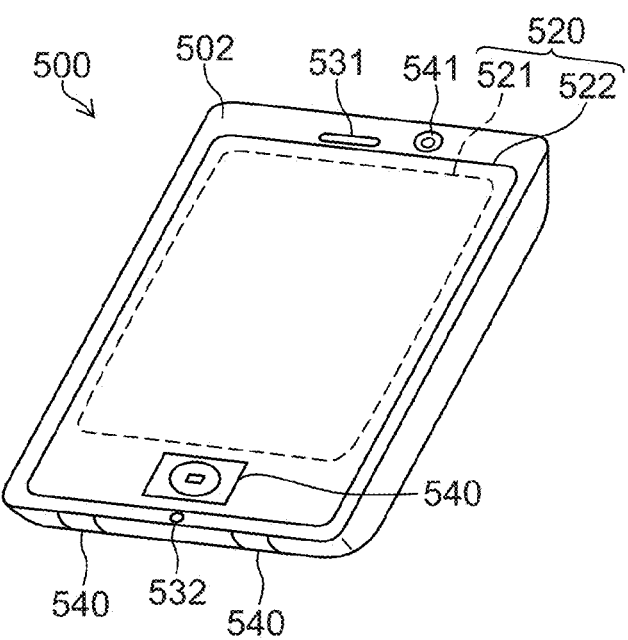

FIG. 19 is an appearance diagram of a smart phone as another embodiment of an image pickup device.

Figure 20:
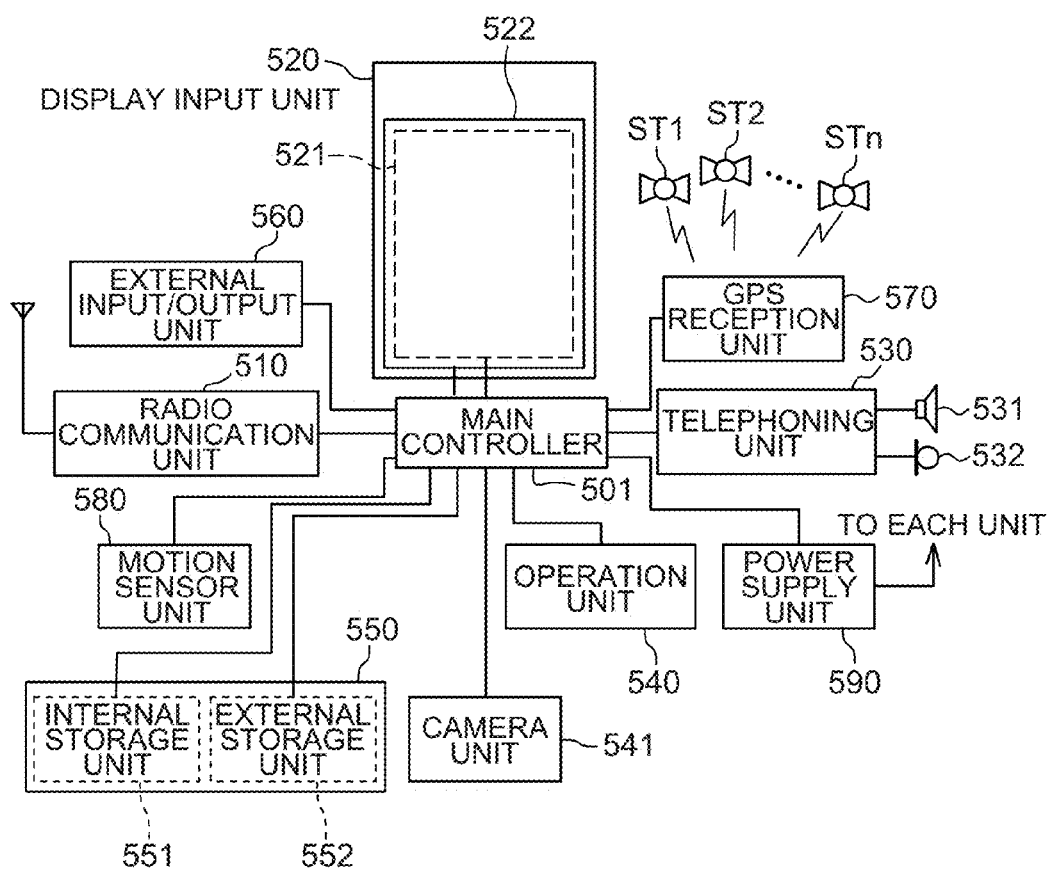

FIG. 20 is a block diagram showing a main part configuration of the smart phone.

DETAILED DESCRIPTION OF THE PREFERRED EMBODIMENTS

Hereinafter, a description is given of embodiments of an image pickup device according the invention with reference to the accompanying drawings.

<Appearance of Image Pickup Device>

Figure 1:
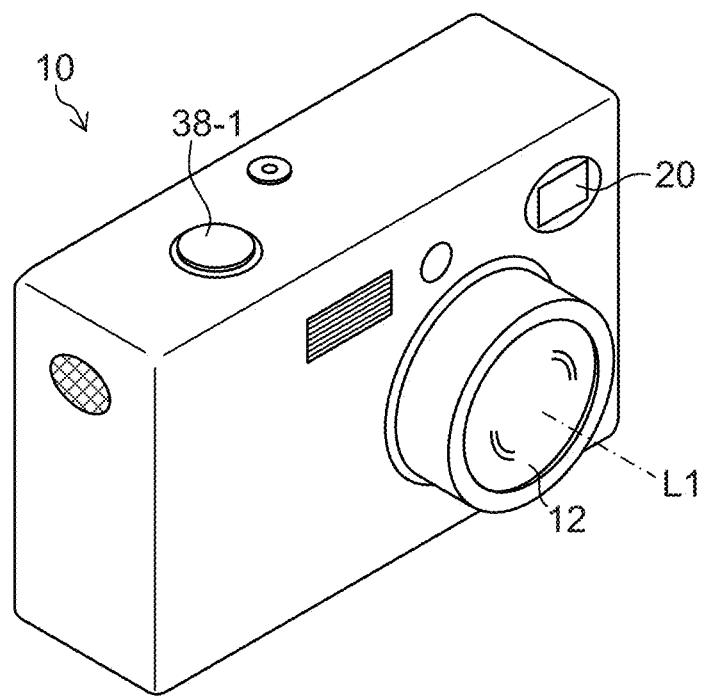
FIG. 1 is an appearance perspective view of an image pickup device according a first embodiment of the invention.

FIG. 1 is an appearance perspective view of an image pickup device of a first embodiment according to the invention. As shown in FIG. 1, an image pickup device 10 has a photographing optical system 12, flash emitting part 20 and the like arranged on a front side thereof, and a shutter button 38-1 provided on a top side thereof. A reference sign L1 designates an optical axis of the photographing optical system 12.

Figure 2:
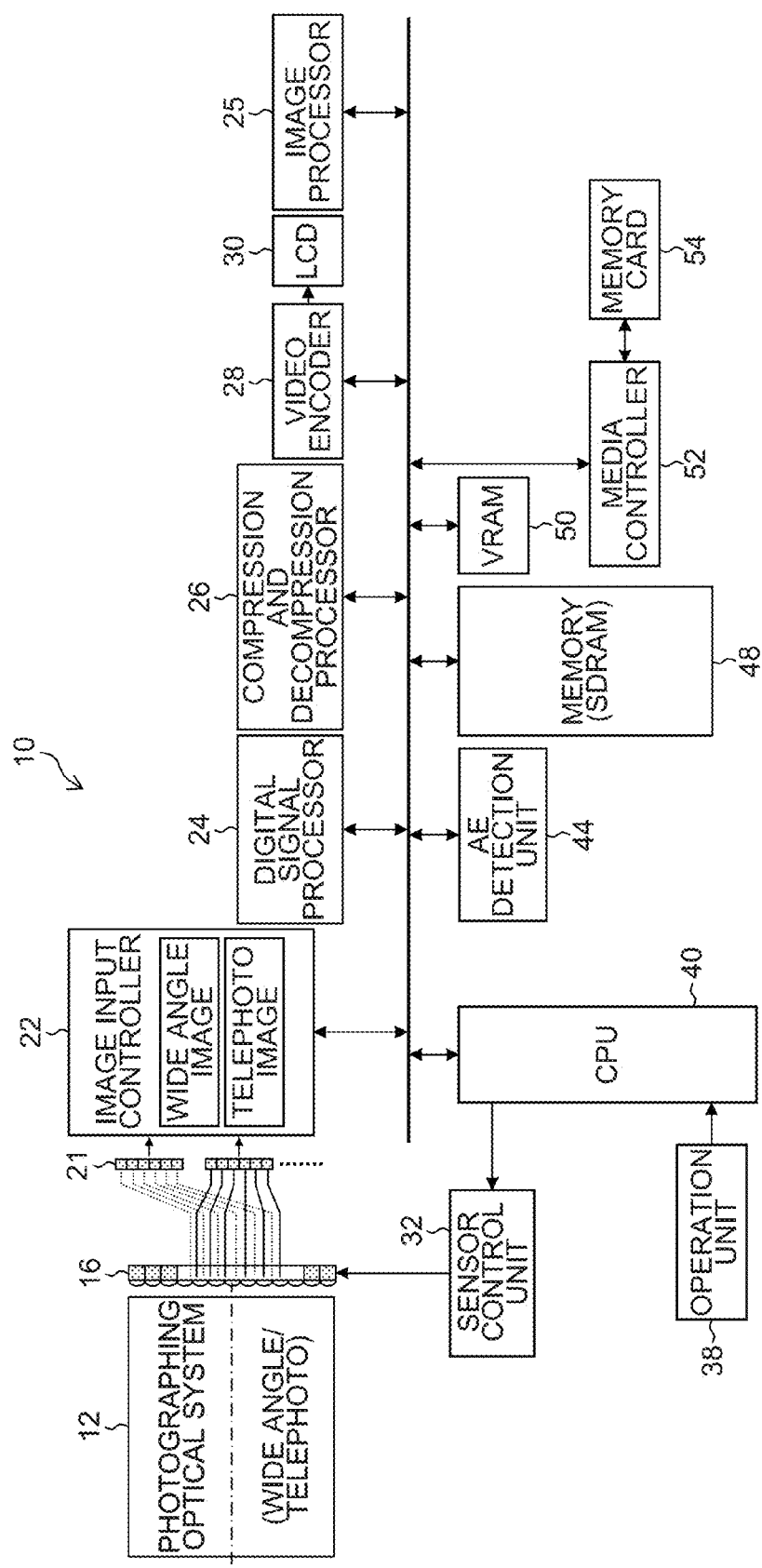
FIG. 2 is a block diagram showing an embodiment of an internal configuration of the image pickup device shown in FIG. 1.

FIG. 2 is a block diagram showing an internal configuration of the image pickup device 10.

The image pickup device 10 which records captured image in a memory card 54 is mainly characterized by the photographing optical system 12 and directional sensor 16.

[Photographing Optical System]

Figure 3:
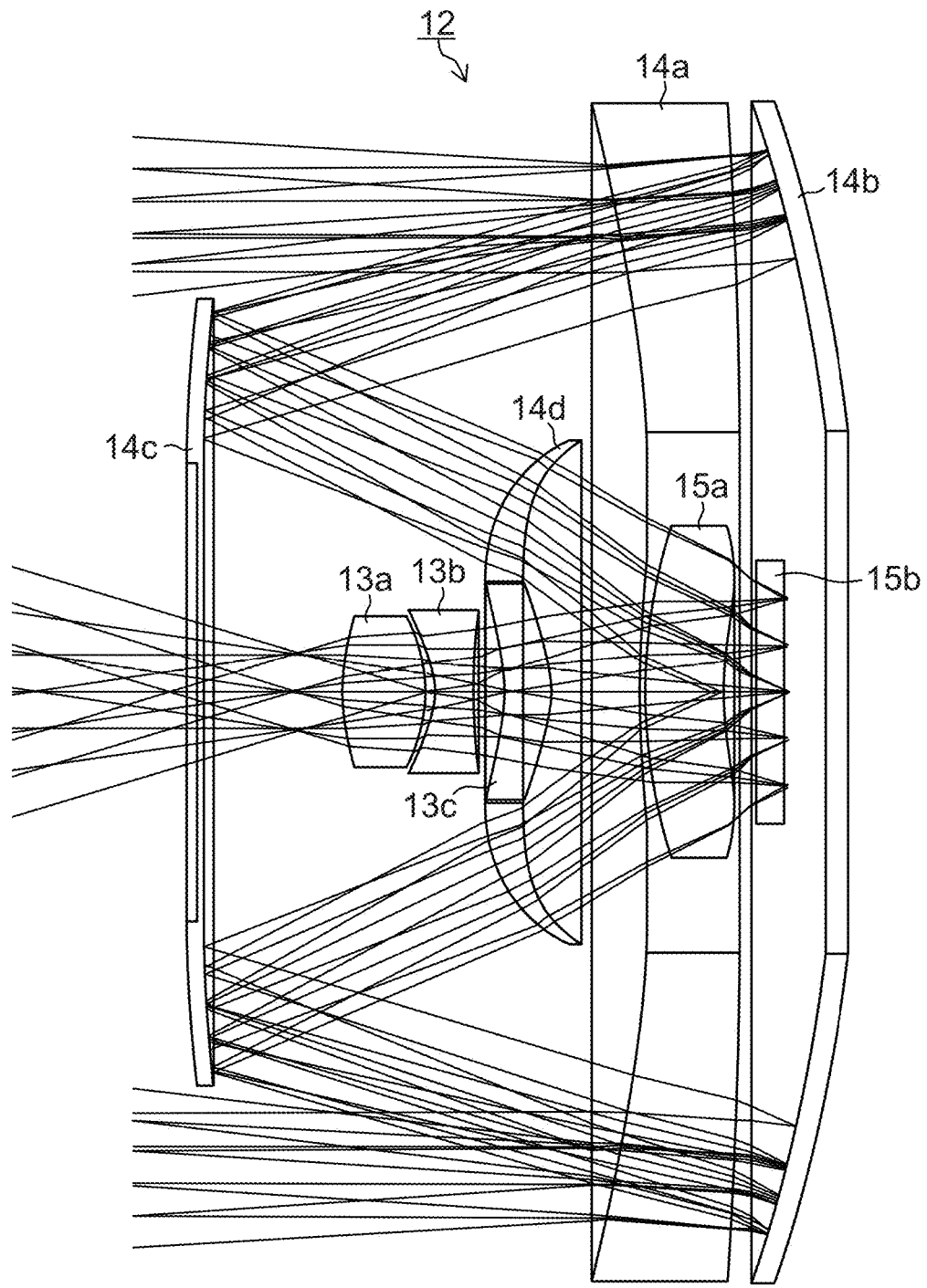
FIG. 3 is a sectional view showing the first embodiment of a photographing optical system applied to the image pickup device shown in FIG. 1.
Figure 4:
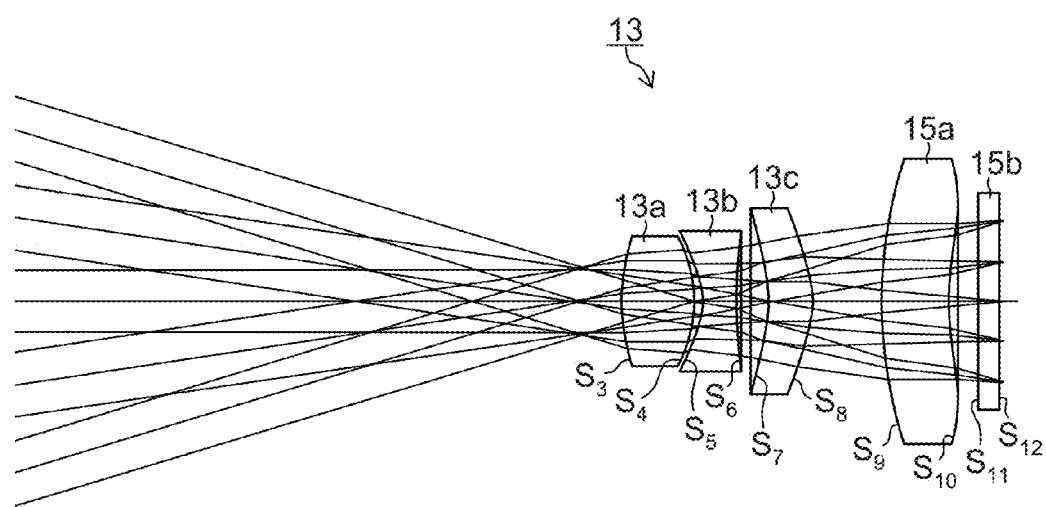
FIG. 4 is a sectional view showing a central optical system in the photographing optical system shown in FIG. 3.
Figure 5:
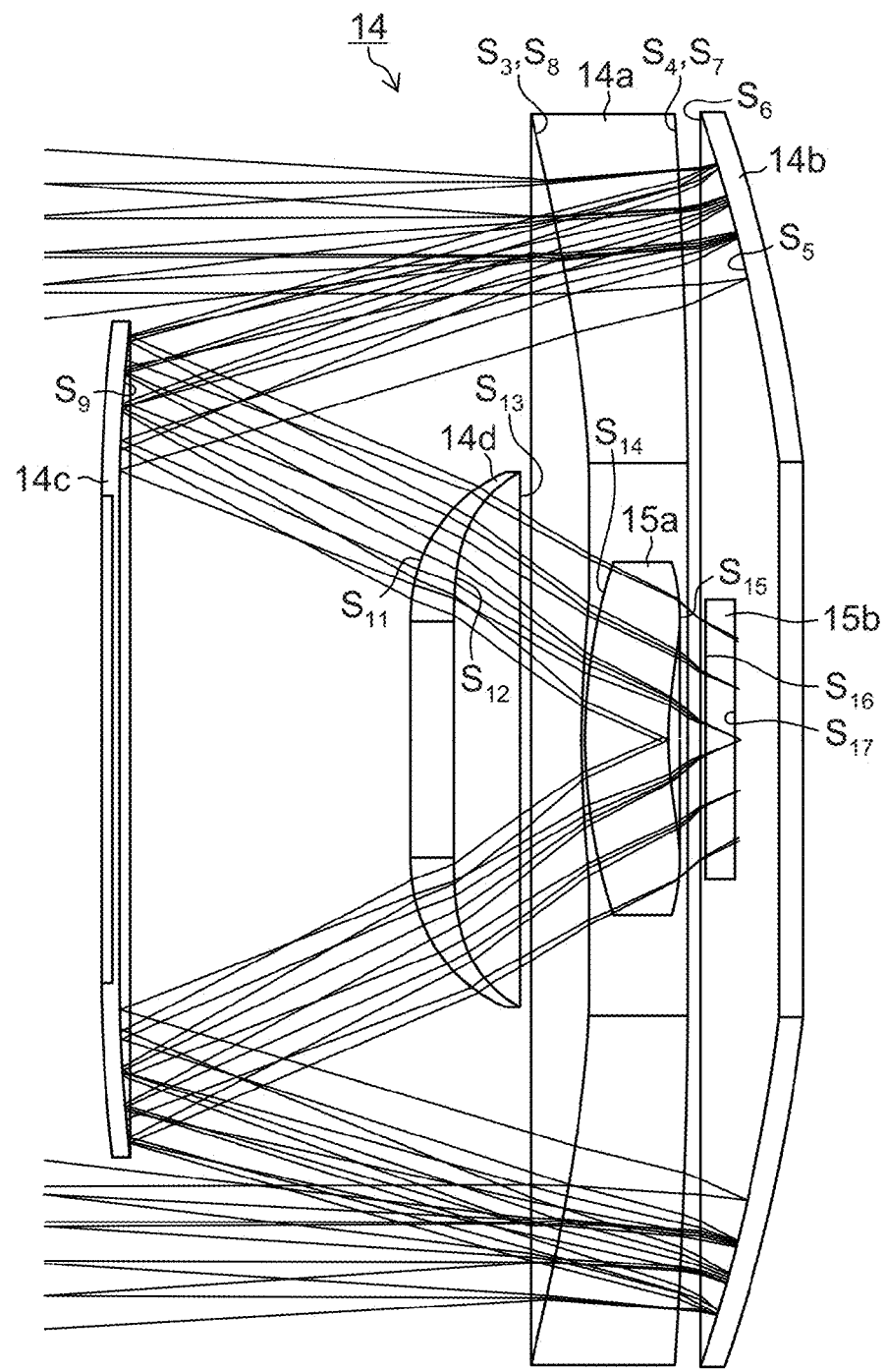
FIG. 5 is a sectional view showing a circular optical system in the photographing optical system shown in FIG. 3.

FIG. 3 is a sectional view showing the first embodiment of the photographing optical system 12 applied to the image pickup device 10. FIG. 4 and FIG. 5 are illustrations showing in a separated state of a central optical system 13 and a circular optical system 14 in the photographing optical system 12.

The photographing optical system 12 includes the central optical system 13 at a central region thereof and the circular optical system 14 at an outer portion of the system 13 which are arranged along the same optical axis (see FIG. 4 and FIG. 5).

The central optical system 13 is a wide angle lens constituted by a first lens 13a, second lens 13b, third lens 13c, lens 15a, and cover glass 15b. The cover glass 15b is disposed in front of the directional sensor 16.

The circular optical system 14 is a telephoto lens constituted by a first lens 14a, first reflective mirror 14b, second reflective mirror 14c, second lens 14d, lens 15a, and cover glass 15b. A light flux incident on the first lens 14a is reflected twice by the first reflective mirror 14b and the second reflective mirror 14c, and then, passes through the second lens 14d, the lens 15a, and cover glass 15b. Folding back the light flux by the first reflective mirror 14b and the second reflective mirror 14c allows a length of the telephoto lens having a long focal length to be shortened in an optical axis direction.

Here, the lens 15a and the cover glass 15b are included in an optical system shared by both central optical system 13 and circular optical system 14.

FIG. 4 is a sectional view showing only the central optical system 13 in the photographing optical system 12 shown in FIG. 3.

A numerical value example of the central optical system 13 including the first lens 13a, the second lens 13b, the third lens 13c, lens 15a, the cover glass 15b and the like as shown in FIG. 4 is as below [Table 1]. In FIG. 4, a surface is designated by a surface number of a reference sign Si (i=1 to 12).

<Numerical Value Example in First Embodiment (Central Optical System 13: Wide Angle Lens)>

TABLE 1

GENERAL LENS DATA

| | |
|---|---|
| Surfaces | 12 |
| Stop | 2 |
| System Aperture | Image Space F# = 2.4 |
| Glass Catalogs | SCHOTT |
| Ray Aiming | Off |

TABLE 1-continued

| | |
|---|---|
| Apodization | Uniform, Factor = 0.00000E+000 |
| Temperature (C.) | 2.00000E+001 |
| Pressure (ATM) | 1.00000E+000 |
| Adjust Index Data to Environment | Off |
| Effective Focal Length | 5.094742 (in air at system temperature and pressure) |
| Effective Focal Length | 5.094742 (in image space) |
| Back Focal Length | 0.05198607 |
| Total Track | 8.00749 |
| in image space F# | 2.4 |
| Paraxial Working F# | 2.4 |
| Working F# | 2.332479 |
| in image space NA | 0.2039543 |
| Object Space NA | 1.061405e-010 |
| Stop Radius | 1.061405 |
| Paraxial Image Height | 2.595901 |
| Paraxial Magnification | 0 |
| Entrance Pupil Diameter | 2.122809 |
| Entrance Pupil Position | 0.2 |
| Exit Pupil Diameter | 2.035911 |
| Exit Pupil Position | −4.834201 |
| Field Type | Angle (in degrees) |
| Maximum Radial Field | 27 |
| Primary Wavelength | 0.55 μm |
| Lens Units | Millimeters |
| Angular Magnification | 1.042683 |
| Fields | 3 |
| Field Type | Angle (in degrees) |

| # | X Value | Y Value | Weight |
|---|---|---|---|
| 1 | 0.000000 | 0.000000 | 1.000000 |
| 2 | 0.000000 | 10.000000 | 1.000000 |
| 3 | 0.000000 | 27.000000 | 1.000000 |

Vignetting Factors

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |

| | | |
|---|---|---|
| Wavelengths | 1 | |
| Units | μm | |

| # | Value | Weight |
|---|---|---|
| 1 | 0.550000 | 1.000000 |

SURFACE DATA SUMMARY:

| Surface | Type | Curvature Radius | Thickness | Glass | Diameter | Conic | |
|---|---|---|---|---|---|---|---|
| Object | STANDARD | Infinity | Infinity | | 0 | 0 | Z |
| 1 | STANDARD | Infinity | 0.2 | | 2.326619 | | 0 |
| Stop | STANDARD | Infinity | 0.73 | | 2.122809 | | 0 |
| 3 | STANDARD | 3.641741 | 1.34 | 1.696800, 55.460000 | 3.258933 | 0 | L1 |
| 4 | STANDARD | −2.680156 | 0.16 | | 3.157928 | | 0 |
| 5 | EVENASPH | −1.853771 | 0.6 | 1.583000, 30.050000 | 3.107938 | −1.01357 | L2 |
| 6 | STANDARD | 9.334449 | 0.6 | | 3.194404 | | 0 |
| 7 | STANDARD | −4.516733 | 0.81 | 1.583000, 30.050000 | 3.244493 | 0 | L3 |
| 8 | EVENASPH | −2.167203 | 1.3 | | 3.54953 | | −3.68581 |
| 9 | STANDARD | 8.777 | 1.21 | 1.583000, 30.050000 | 6 | 0 | L4 |
| 10 | EVENASPH | 3.135 | 0.5574901 | | 6 | | −20.3353 |
| 11 | STANDARD | Infinity | 0.5 | 1.516800, 64.200000 | 5.2 | 0 | Glass |
| 12 Image | STANDARD | Infinity | | | 5.2 | | 0 |

SURFACE DATA DETAIL:

| | |
|---|---|
| Surface Object | STANDARD Z |
| Surface 1 | STANDARD |
| Surface Stop | STANDARD |
| Surface 3 | STANDARD L1 |
| Surface 4 | STANDARD |
| Surface 5 | EVENASPH L2 |
| Coefficient on r2 | 0 |
| Coefficient on r4 | 0.00250152 |
| Coefficient on r6 | −0.000193495 |

TABLE 1-continued

| | |
|---|---|
| Coefficient on r8 | 0 |
| Coefficient on r10 | 0 |
| Coefficient on r12 | 0 |
| Coefficient on r14 | 0 |
| Coefficient on r16 | 0 |
| Surface 6 | STANDARD |
| Surface 7 | STANDARD L3 |
| Surface 8 | EVENASPH |
| Coefficient on r2 | 0 |
| Coefficient on r4 | −0.00387959 |
| Coefficient on r6 | 0.00277573 |
| Coefficient on r8 | 0.000133673 |
| Coefficient on r10 | 3.64299e−005 |
| Coefficient on r12 | 0 |
| Coefficient on r14 | 0 |
| Coefficient on r16 | 0 |
| Surface 9 | STANDARD L4 |
| Aperture | Floating Aperture |
| Maximum Radius | 3 |
| Surface 10 | EVENASPH |
| Coefficient on r2 | 0 |
| Coefficient on r4 | −0.0137242 |
| Coefficient on r6 | 0.00142977 |
| Coefficient on r8 | −0.000101171 |
| Coefficient on r10 | 1.64597e−006 |
| Coefficient on r12 | 0 |
| Coefficient on r14 | 0 |
| Coefficient on r16 | 0 |
| Aperture | Floating Aperture |
| Maximum Radius | 3 |
| Surface 11 | STANDARD Glass |
| Aperture | Floating Aperture |
| Maximum Radius | 2.6 |
| Surface 12 Image | STANDARD |

FIG. 5 is a sectional view showing only the circular optical system 14 in the photographing optical system 12 shown in FIG. 3.

As shown in FIG. 5, a numerical value example of the circular optical system 14 including the first lens 14a, the first reflective mirror 14b, the second reflective mirror 14c, the second lens 14d, the lens 15a, the cover glass 15b and the like is as below [Table 2]. In FIG. 5, a surface is designated by a surface number of a reference sign Si (i=1 to 17).

<Numerical Value Example in First Embodiment (Circular Optical System 14: Telephoto Lens)>

TABLE 2

| GENERAL LENS DATA | |
|---|---|
| Surfaces | 17 |
| Stop | 2 |
| System Aperture | Entrance Pupil Diameter = 16 |
| Glass Catalogs | SCHOTT |
| Ray Aiming | Off |
| Apodization | Uniform, Factor = 0.00000E+000 |
| Temperature (C.) | 2.00000E+001 |
| Pressure (ATM) | 1.00000E+000 |
| Adjust Index Data to Environment | Off |
| Effective Focal Length | 13.08991(in air at system temperature and pressure) |
| Effective Focal Length | 13.08991 (in image space) |
| Back Focal Length | −0.01287807 |
| Total Track | 10.8 |
| in image space F# | 0.8181191 |
| Paraxial Working F# | 0.8181191 |
| Working F# | 0.8026466 |
| in image space NA | 0.5214791 |
| Object Space NA | 8e−010 |
| Stop Radius | 8 |
| Paraxial Image Height | 1.839666 |
| Paraxial Magnification | 0 |
| Entrance Pupil Diameter | 16 |
| Entrance Pupil Position | 8 |
| Exit Pupil Diameter | 13.98026 |
| Exit Pupil Position | −11.4504 |
| Field Type | Angle (in degrees) |
| Maximum Radial Field | 8 |
| Primary Wavelength | 0.5875618 μm |
| Lens Units | Millimeters |
| Angular Magnification | 1.144481 |

TABLE 2-continued

| Fields | 8 |
|---|---|
| Field Type | Angle (in degrees) |

| # | X Value | Y Value | Weight |
|---|---|---|---|
| 1 | 0.000000 | 0.000000 | 1.000000 |
| 2 | 0.000000 | 2.000000 | 1.000000 |
| 3 | 0.000000 | 4.000000 | 1.000000 |
| 4 | 0.000000 | 6.000000 | 0.000000 |
| 5 | 0.000000 | 8.000000 | 0.000000 |
| 6 | 0.000000 | −3.000000 | 1.000000 |
| 7 | 0.000000 | −5.000000 | 0.000000 |
| 8 | 0.000000 | −7.000000 | 0.000000 |

| Vignetting Factors | | | | | |
|---|---|---|---|---|---|
| # | VDX | VDY | VCX | VCY | VAN |
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |
| 6 | 0.000000 | 0.000000 | 0.000000 | 0.000000 | 0.000000 |
| 7 | 0.000000 | 0.000000 | 0.000000 | 0.000000 | 0.000000 |
| 8 | 0.000000 | 0.000000 | 0.000000 | 0.000000 | 0.000000 |

| Wavelengths | 3 |
|---|---|
| Units | µm |

| # | Value | Weight |
|---|---|---|
| 1 | 0.486133 | 1.000000 |
| 2 | 0.587562 | 1.000000 |
| 3 | 0.656273 | 1.000000 |

SURFACE DATA SUMMARY:

| Surfaces | Type | Curvature Radius | Thickness | Glass | Diameter | Conic |
|---|---|---|---|---|---|---|
| Object | STANDARD | Infinity | Infinity | | 0 | 0 |
| 1 | STANDARD | Infinity | 8 | | 18.24865 | 0 |
| Stop | STANDARD | Infinity | 0 | | 16 | 0 |
| 3 | EVENASPH | −38.9422 | 1.2 | SK6 | 16.24017 | −0.8764911 |
| 4 | EVENASPH | −189.0192 | 1.6 | | 16.38624 | 28.84007 |
| 5 | STANDARD | −28.87438 | 0 | MIRROR | 16.66602 | −0.6495759 |
| 6 | STANDARD | Infinity | −1.6 | | 17.69315 | 0 |
| 7 | EVENASPH | −189.0192 | −1.2 | SK6 | 16.30225 | 28.84007 |
| 8 | EVENASPH | −38.9422 | −7 | | 15.5352 | −0.8764911 |
| 9 | STANDARD | 110 | 4.1 | MIRROR | 12.98573 | 246.4822 |
| 10 | STANDARD | Infinity | 0 | | 8.541992 | 0 |
| 11 | EVENASPH | 10.48836 | 0.81 | 1.583000, 30.05000 | 7.221966 | 0.1581105 L3 |
| 12 | EVENASPH | −39.02395 | 0 | | 7.03354 | −1544.723 |
| 13 | STANDARD | Infinity | 1.8 | | 7.700362 | 0 |
| 14 | STANDARD | 8.777 | 1.21 | 1.583000, 30.05000 | 6 | 0 L4 |
| 15 | EVENASPH | 3.135 | 0.5574901 | | 5.2 | −20.3353 |
| 16 | STANDARD | Infinity | 0.5 | 1.516800, 64.20000 | 2.739079 | 0 Glass |
| 17 Image | STANDARD | Infinity | | | 5.2 | 0 |

SURFACE DATA DETAIL:

| Surface Object | STANDARD |
|---|---|
| Surface 1 | STANDARD |
| Aperture | Circular Aperture |
| Minimum Radius | 6 |
| Maximum Radius | 10 |
| Surface Stop | STANDARD |
| Aperture | Circular Aperture |
| Minimum Radius | 5 |
| Maximum Radius | 9 |
| Surface 3 | EVENASPH |
| Coefficient on r2 | 0 |
| Coefficient on r4 | 1.8366007e−007 |
| Coefficient on r6 | −2.6273128e−008 |
| Coefficient on r8 | 0 |
| Coefficient on r10 | 0 |
| Coefficient on r12 | 0 |
| Coefficient on r14 | 0 |
| Coefficient on r16 | 0 |

TABLE 2-continued

| | |
|---|---|
| Aperture | Circular Aperture |
| Minimum Radius | 4 |
| Maximum Radius | 9 |
| Surface 4 | EVENASPH |
| Coefficient on r2 | 0 |
| Coefficient on r4 | −4.922135e−007 |
| Coefficient on r6 | 7.1974477e−008 |
| Coefficient on r8 | 0 |
| Coefficient on r10 | 0 |
| Coefficient on r12 | 0 |
| Coefficient on r14 | 0 |
| Coefficient on r16 | 0 |
| Aperture | Circular Aperture |
| Minimum Radius | 4 |
| Maximum Radius | 9 |
| Surface 5 | STANDARD |
| Mirror Substrate | Curved, Thickness = 3.33320E−001 |
| Aperture | Circular Aperture |
| Minimum Radius | 4 |
| Maximum Radius | 9 |
| Surface 6 | STANDARD |
| Surface 7 | EVENASPH |
| Coefficient on r2 | 0 |
| Coefficient on r4 | −4.922135e−007 |
| Coefficient on r6 | 7.1974477e−008 |
| Coefficient on r8 | 0 |
| Coefficient on r10 | 0 |
| Coefficient on r12 | 0 |
| Coefficient on r14 | 0 |
| Coefficient on r16 | 0 |
| Aperture | Circular Aperture |
| Minimum Radius | 4 |
| Maximum Radius | 9 |
| Surface 8 | EVENASPH |
| Coefficient on r2 | 0 |
| Coefficient on r4 | 1.8366007e−007 |
| Coefficient on r6 | −2.6273128e−008 |
| Coefficient on r8 | 0 |
| Coefficient on r10 | 0 |
| Coefficient on r12 | 0 |
| Coefficient on r14 | 0 |
| Coefficient on r16 | 0 |
| Aperture | Circular Aperture |
| Minimum Radius | 4 |
| Maximum Radius | 9 |
| Surface 9 | STANDARD |
| Mirror Substrate | Curved, Thickness = 2.59715E−001 |
| Aperture | Circular Aperture |
| Minimum Radius | 3.5 |
| Maximum Radius | 6 |
| Surface 10 | STANDARD |
| Aperture | Circular Aperture |
| Minimum Radius | 1.622247 |
| Maximum Radius | 6 |
| Surface 11 | EVENASPH L3 |
| Coefficient on r2 | 0 |
| Coefficient on r4 | −0.00078081372 |
| Coefficient on r6 | 0.00010352365 |
| Coefficient on r8 | 8.2555892e−006 |
| Coefficient on r10 | 4.6862634e−007 |
| Coefficient on r12 | 0 |
| Coefficient on r14 | 0 |
| Coefficient on r16 | 0 |
| Aperture | Circular Aperture |
| Minimum Radius | 1.774765 |
| Maximum Radius | 3.6 |
| Surface 12 | EVENASPH |
| Coefficient on r2 | 0 |
| Coefficient on r4 | −0.0012390633 |
| Coefficient on r6 | 0.00034352026 |
| Coefficient on r8 | −4.5651306e−006 |
| Coefficient on r10 | 5.9463077e−007 |
| Coefficient on r12 | 0 |
| Coefficient on r14 | 0 |
| Coefficient on r16 | 0 |
| Aperture | Circular Aperture |
| Minimum Radius | 1.774765 |
| Maximum Radius | 3.6 |
| Aperture | Circular Aperture |
| Minimum Radius | 1.622247 |

TABLE 2-continued

| | |
|---|---|
| Maximum Radius | 3.8 |
| Surface 14 | STANDARD |
| Aperture | Floating Aperture |
| Maximum Radius | 3 |
| Surface 15 | EVENASPH |
| Coefficient on r2 | 0 |
| Coefficient on r4 | −0.0137242 |
| Coefficient on r6 | 0.00142977 |
| Coefficient on r8 | −0.000101171 |
| Coefficient on r10 | 1.64597e−006 |
| Coefficient on r12 | 0 |
| Coefficient on r14 | 0 |
| Coefficient on r16 | 0 |
| Aperture | Floating Aperture |
| Maximum Radius | 2.6 |
| Surface 16 | STANDARD Glass |
| Surface 17 Image | STANDARD |

[Directional Sensor]

Next, a description is given of the directional sensor 16 shown in FIG. 2.

The directional sensor 16 has a plurality of pixels including two-dimensionally arranged photoelectric conversion elements (light receiving cells), and is configured to include pixels for selectively receiving the light beams of the light fluxes which are incident via the central optical system 13 and the circular optical system 14 by applying pupil division by a pupil division device shown below.

The directional sensor is classified into a pupil image separation method using a pupil imaging lens (microlens) and a light shielding mask method.

(a) portion of FIG. 6 is a schematic view showing the pupil image separation method. In the pupil image separation method, the plural light receiving cells 18 (pixels) are allocated to one microlens 17*a*, and a pupil image entering into the microlens 17*a* is formed into an image on the plural light receiving cells 18 by the microlens 17*a*. Therefore, the pupil image is separated depending on an angle of the light incident on the microlens 17*a* to be formed into an image on the corresponding light receiving cell 18.

(b) portion of FIG. 6 is a schematic view showing the light shielding mask method. In the light shielding mask method, a light shielding mask 19 is disposed between the microlens 17*b* and the light receiving cell 18, and the light shielding mask 19 blocks out a light incident in a direction of a part of the light beams incident on the microlens 17*b* and makes a light only in the incident direction corresponding to an opening of the light shielding mask 19 to be incident on the light receiving cell 18.

FIG. 7 is a main part plan view of a directional sensor of pupil image separation method. This directional sensor is a four pixels one microlens type for sharing one microlens 17*a* by four pixels, and can acquire images of four viewpoints of left, right, top and bottom. Four pixels corresponding to each microlens 17*a* respectively have any one color filter of red (R), green (G) and blue (B) color filters arranged. In this case, the images of four viewpoints are rotated by 45 degrees to respectively obtain a filter arrangement of Bayer arrangement.

The number of pixels allocated to one microlens is arbitrary, and, for example, 100 pixels may be allocated to one microlens in a certain case. In this case, a pixel size per one viewpoint is decreased.

FIG. 8 is a main part plan view of a directional sensor of light shielding mask method. This directional sensor has pairs of pixels for each color of RGB arranged thereon, one of the pair having a light shielding mask 19*a* disposed whose opening (rectangular part) is formed on the left side on FIG. 8, and the other of the pair having a light shielding mask 19*b* disposed whose opening is formed on the right side. Images including pixels of odd lines and pixels of even lines read out from the directional sensor correspond to images of two viewpoints in left-and-right direction. Each image is a mosaic image of the Bayer arrangement.

The opening of the light shielding mask may have any shape, and the light only in the incident direction corresponding to the opening can be made incident on the light receiving cell.

FIG. 9 is an illustration showing pupil shapes corresponding to the central optical system 13 and the circular optical system 14, and showing tracking of light rays by incident direction of the light ray passing through the central optical system 13 and the circular optical system 14.

(a) portion of FIG. 9 shows an illustration tracking an incident light at an incident angle of 0 degree, and the pupil shapes corresponding to the central optical system 13 and the circular optical system 14. As shown in the figure, in a layout where the central optical system 13 is embedded at a central region of the circular optical system 14 of reflective mirror type, an incident light straight from the front results in a circular pupil and a toric pupil.

(b) portion of FIG. 9 shows an illustration tracking an incident light at an incident angle of 3.2 degree, and the pupil shapes corresponding to the central optical system 13 and the circular optical system 14, and (c) portion of FIG. 9 shows an illustration tracking an incident light at an incident angle of 14.4 degree, and the pupil shapes corresponding to the central optical system 13 and the circular optical system 14.

As shown in (b) portion and (c) portion of FIG. 9, as an angle of oblique incident increases, mechanical vignetting begins to occur in the circular optical system 14 that is a telephoto lens having a narrow field and the toric pupil is decreased and deformed into a crescentic shape, and when the angle reaches 14.4 degrees, the light rarely passes through the pupil.

The circular pupils corresponding to the central optical system 13 are shown with the same shape on FIG. 9, but are deformed depending on the incident angle.

[Optimization of Directional Sensor Configuration]

As described in FIG. 9, the pupil shape/size for effectively passing the light varies depending on the incident angle (depending on an image height on the sensor surface).

Therefore, in the case of the directional sensor of pupil image separation method shown in FIG. 10, if a configuration of the directional sensor of pupil image separation method is uniform between the center and periphery of the sensor, the useless light receiving cell where no light is incident is brought about at the periphery of the sensor, which reduces light use efficiency.

FIG. 11 is an illustration showing the first embodiment of a directional sensor 16*a* according to the invention. The directional sensor 16*a* has a configuration in which the number of the light receiving cells covered by one microlens decreases from the center toward the periphery (as the image height increases). In the example shown in FIG. 11, the number of the light receiving cells covered by one microlens (the number of cells in an up-and-down direction on the plane of paper) is three at the center (incident angle 0 degree), two at a halfway portion (incident angle 3.2 degrees), and one at the periphery (incident angle 14.4 degrees).

As shown in FIG. 11, in a case where a size of the light receiving cell is identical, a size and focal length of the microlens used is smaller and shorter toward the periphery. This allows that the closer to the periphery, the higher density sampling is obtained.

In the periphery of the directional sensor, the microlens corresponds to the light receiving cell on a one-to-one basis, and the pupil division function is not possessed. Specifically, an image circle corresponding to the circular optical system 14 is virtually smaller than an image circle corresponding to the central optical system 13 due to the mechanical vignetting in the sensor periphery. Therefore, in the directional sensor 16*a*, a pixel having the pupil division function is disposed at only a region where two image circles overlap one another, and a pixel not having the pupil division function is disposed at a region where the image circles do not overlap one another.

Note that it may be that the size of the microlens is uniform and the size of the light receiving cell increases toward the periphery. In this case, the closer the periphery, the larger a light receiving area of the light receiving cell, which leads to an advantageous S/N (signal-to-noise ratio).

On the other hand, in a case of the directional sensor of light shielding mask method shown in FIG. 12, if the shape of the light shielding mask is uniform between the center and periphery of the sensor, the useless light receiving cell where no light is incident is brought about at the periphery of the sensor, which reduces light use efficiency.

FIG. 13 is an illustration showing a second embodiment of a directional sensor 16*b* according to the invention. The directional sensor 16*b* employs the light shielding mask which has an opening of a shape/size corresponding to the pupil shape, the pupil shapes of the central optical system 13 and circular optical system 14 varying depending on a position of the sensor surface.

In other words, the light shielding mask having a circle or toric opening is used at the sensor center, and the toric pupil is gradually decreased and deformed into a crescentic shape toward the periphery, and thus, the opening shape of the mask is made to have the similar shape. In addition to this, it is preferable to slightly shift the optical axis of the micro (condenser) lens with respect to the light receiving cell (to perform scaling). It may be that, at a region in the periphery where the toric pupil is fully mechanically vignetted, no light receiving cell for the circular optical system 14 is arranged and only the light receiving cell for the central optical system 13 is arranged. In this case, an incident light amount can be increased in the sensor periphery without necessity of disposing the light shielding mask on the light receiving cell for the central optical system 13 in the sensor periphery.

[New Problem of Directional Sensor 16*a*]

In the directional sensor 16*a* in the first embodiment shown in FIG. 11, the closer to the sensor periphery, the higher density sampling can be obtained as described above. This raises, when viewed from the opposite side, a problem of lower density sampling at the center.

Then, this problem is dealt with on the photographing optical system side. Specifically, used is an optical system having image forming characteristics that a magnifying power (image forming magnification) for an object space is different between the center and the periphery. In other words, the central optical system 13 uses an optical system having the image forming characteristics that the image forming magnification is large at the central region and small on the peripheral side, like a fisheye lens shown in FIG. 14. This finally uniforms the sampling density in the object space.

On the other hand, in the directional sensor 16*a* in the first embodiment, the closer to the sensor center, the higher density sampling can be obtained for the images corresponding to the circular optical system 14.

Therefore, the circular optical system 14 uses an optical system having the image forming characteristics that the image forming magnification is smaller on the inner diameter side and larger on the outer diameter side (characteristics similar to a reverse fisheye lens). This can uniform the sampling density in the object space.

Referring back to FIG. 2, the image pickup device 10 includes the photographing optical system 12 having the central optical system 13 and circular optical system 14 described in FIG. 3 to FIG. 5, and the directional sensor 16 that is any one of the directional sensor 16*a* in the first embodiment described in FIG. 11 or the directional sensor 16*b* in the second embodiment described in FIG. 13. Operation of the overall device is collectively controlled by a central processing unit (CPU) 40.

The image pickup device 10 is provided with an operation unit 38 including a shutter button 38-1, mode dial (mode switcher), play button, MENU/OK key, cross-shaped key, BACK key and the like. The signal from the operation unit 38 is input to the CPU 40, and the CPU 40 controls the circuits in the image pickup device 10 on the basis of the input signal to perform, for example, imaging operation control, image processing control, image data record/play control, display control of a liquid crystal monitor (LCD) 30, and the like.

The shutter button 38-1 (FIG. 1) which is an operation button for inputting an instruction to start imaging includes a two-stage stroke type switch having an S1 switch to be turned on in halfway press and an S2 switch to be turned on in full press.

The mode dial is a selection device for switching among an automatic imaging mode for imaging a still image, a manual imaging mode, a scene position for human, landscape, nightscape or the like, and a moving picture mode for taking a moving picture. The mode dial functions in the imaging mode as a selection device for switching among a first imaging mode for acquiring a first image (wide angle image) formed via the central optical system 13, a second imaging mode for acquiring a second image (telephoto image) formed via the circular optical system 14, a hybrid imaging mode for simultaneously acquiring the wide angle image and the telephoto image, and the like.

The play button is a button for switching to a play mode for displaying the imaged and recorded still image or moving picture on the liquid crystal monitor 30. The MENU/OK key is an operation key having both a function as a menu button for instructing to display a menu on the liquid crystal monitor 30 screen and a function as an OK button for instructing to confirm and execute the selected content. The cross-shaped key is an operation unit for inputting an instruction of four directions up, down, right and left, and functions as a button for selecting an item from a menu screen and instructing to select various setting items from each menu (cursor movement control device). Up/down keys of the cross-shaped key function as a zoom switch in imaging or a play zoom switch in the play mode, and right/left keys function as a frame-by-frame playback (forward/backward playback) button for in the play mode. The BACK key is used to delete a desired target such as the selected item, cancel the instructed content, or undo the last operation.

In the imaging mode, the subject light is formed into an image on a light receiving surface of the directional sensor 16 via the photographing optical system 12.

A subject image formed on the light receiving surface of each light receiving cell of the directional sensor 16 is converted into a signal voltage (or electrical charge) of an amount corresponding to the incident light amount thereof. The directional sensor 16 has a color filter of RGB for each microlens disposed thereon.

The signal voltage (or electrical charge) accumulated in the directional sensor 16 is stored in the light receiving cell itself or a capacitor attached. The accumulated signal voltage (or electrical charge) is read out by way of a method of MOS type image pickup element using the X-Y address method (so-called CMOS sensor) by a sensor control unit 32 (image readout device) when selecting the pixel position.

This makes it possible to read out from the directional sensor 16 image signals representing the wide angle image (first image) constituted by a pixel group corresponding to the central optical system 13 and image signals representing the telephoto image (the second image) constituted by a pixel group corresponding to the circular optical system 14.

The image signal (voltage signal) read out from the directional sensor 16 is subjected to a correlated double sampling process (a process in which, for the purpose of reducing noises (especially, thermal noise) and the like contained in a sensor output signal, a difference between a feed-through component level and an image signal component level contained in an output signal for one pixel of the sensor is taken to obtain the accurate pixel data) such that the R, G, or B signal for each pixel is sampled and held, and then, after being amplified, added to an A/D converter 21. The A/D converter 21 converts the serially input R, G, and B signals into digital R, G, and B signals and outputs to an image input controller 22. Some MOS type sensors have the A/D converter built therein, and in this case, the R, G, and B digital signals are directly output from the directional sensor 16.

The image signals representing the wide angle image and the image signals representing the telephoto image can be selectively read out by selecting the pixel position and reading out the pixel data of the directional sensor 16, but it may be that all image data is read out from the directional sensor 16 and temporarily stored in a memory (SDRAM) 48, and then, two images data of the wide angle image and the telephoto image is extracted from the memory 48.

A digital signal processor 24 subjects the digital image signal input via the image input controller 22 to a predetermined signal process such as a offset process, gain control processing including white balance correction and sensitivity correction, gamma correction processing, RGB/YC conversion processing for converting from the RGB signals to a luminance signal Y and color-difference signals Cr and Cb.

The image data processed by an image processor 25 is input to a VRAM (Video Random Access Memory) 50. The image data read out from the VRAM 50 is encoded by a video encoder 28, and output to the liquid crystal monitor 30 provided on the back side of a camera, which allows the subject image to be displayed on a display screen of the liquid crystal monitor 30.

When the shutter button 38-1 of the operation unit 38 is pressed down at the first stage (halfway press), the CPU 40 starts an AE operation, and the image data output from the A/D converter 21 is taken in an AE detection unit 44.

The AE detection unit 44 cumulates G signals in the entire screen or cumulates the G signals weighted differently between the central region and outer portion in the screen to output that cumulated value to the CPU 40. The CPU 40 calculates brightness of the subject (imaging Ev value) on the basis of the cumulated value input from the AE detection unit 44, determines based on the imaging Ev value an aperture value of a diaphragm (not shown) and an electronic shutter (shutter speed) of the directional sensor 16 in accordance with a predetermined program diagram, and controls based on the determined aperture value the diaphragm as well as controls based on the determined the shutter speed an electrical charge accumulation duration in the directional sensor 16 via the sensor control unit 32.

After the AE operation ends, when the shutter button 38-1 is pressed at the second stage (full press), the image data output from the A/D converter 21 in response to the pressing is input to and temporarily stored in the memory (SDRAM: Synchronous Dynamic RAM) 48 from the image input controller 22. The image data temporarily stored in the memory 48 is adequately read out by the digital signal processor 24 and the image processor 25, where a predetermined signal process including a process for generating luminance data and color-difference data of the image data (YC processing) is performed. The image data having being subjected to the YC processing (YC data) is again stored in the memory 48.

The YC data stored in the memory 48 is respectively output to a compression and decompression processor 26 and subjected to a predetermined compression process such as the JPEG (Joint Photographic Experts Group), and thereafter, recorded via a media controller 52 in the memory card 54.

Then, when the first imaging mode or the second imaging mode is selected by use of the mode dial, the wide angle image or the telephoto image can be selectively acquired, and when the hybrid imaging mode is selected by use of the mode dial, the wide angle image and the telephoto image can be simultaneously acquired. This makes it possible to acquire the wide angle image and the telephoto image without mechanically switching between the wide angle lens and the telephoto lens and without a zoom operation of the zoom lens.

[Second Embodiment of Photographing Optical System]

FIG. 15 is a sectional view showing a second embodiment of a photographing optical system 112 applied to the image pickup device 10. FIG. 16 and FIG. 17 are illustrations showing in a separated state of a central optical system 113 and circular optical system 114 in a photographing optical system 112, respectively.

The photographing optical system 112 includes the central optical system 113 at a central region thereof and the circular optical system 114 at an outer portion of the system 113 which are arranged along the same optical axis (see FIG. 16 and FIG. 17).

The central optical system 113 is a wide angle lens constituted by a first lens 113a, second lens 113b, third lens 113c, lens 115a, and cover glass 115b. The cover glass 115b is disposed in front of the directional sensor 16.

The circular optical system 114 is a telephoto lens constituted by a first reflective mirror 114a, second reflective mirror 114b, lens 114c, lens 115a, and cover glass 115b.

Here, the lens 115a and the cover glass 115b are included in an optical system shared by both central optical system 113 and circular optical system 114.

The photographing optical system 112 in the second embodiment has the lenses of the circular optical system the number of which is less by one than the photographing optical system 12 in the first embodiment shown in FIG. 3.

The image formed position is positioned on the object side with respect to the first reflective mirror 114a, and the directional sensor 16 is arranged on the object side with respect to the first reflective mirror 114a. This allows that a thickness of an image pickup unit including the photographing optical system 112 and directional sensor 16 is a thickness of the photographing optical system 112.

A numerical value example of the central optical system 113 including the first lens 113a, the second lens 113b, the third lens 113c, the lens 115a, the cover glass 115b and the like as shown in FIG. 16 is as below [Table 3]. In FIG. 16, a surface is designated by a surface number of a reference sign Si (i=1 to 12).

<Numerical Value Example in Second Embodiment (Central Optical System 113: Wide Angle Lens)>

TABLE 3

| GENERAL LENS DATA | |
|---|---|
| Surfaces | 12 |
| Stop | 2 |
| System Aperture | Image Space F# = 2.8 |
| Glass Catalogs | SCHOTT |
| Ray Aiming | Off |
| Apodization | Uniform, Factor = 0.00000E+000 |
| Temperature (C.) | 2.00000E+001 |
| Pressure (ATM) | 1.00000E+000 |
| Adjust Index Data to Environment | Off |
| Effective Focal Length | 4.380528 (in air at system temperature and pressure) |
| Effective Focal Length | 4.380528 (in image space) |
| Back Focal Length | −0.06733382 |
| Total Track | 7.03 |
| in image space F# | 2.8 |
| Paraxial Working F# | 2.8 |
| Working F# | 2.831729 |
| in image space NA | 0.1757906 |
| Object Space NA | 7.822371e−011 |
| Stop Radius | 0.7822371 |
| Paraxial Image Height | 2.23199 |
| Paraxial Magnification | 0 |
| Entrance Pupil Diameter | 1.564474 |
| Entrance Pupil Position | 0.5 |
| Exit Pupil Diameter | 2.226372 |
| Exit Pupil Position | −6.301174 |
| Field Type | Angle (in degrees) |
| Maximum Radial Field | 27 |
| Primary Wavelength | 0.55 μm |
| Lens Units | Millimeters |
| Angular Magnification | 0.7027013 |
| Fields | 3 |
| Field Type | Angle (in degrees) |

| # | X Value | Y Value | Weight |
|---|---|---|---|
| 1 | 0.000000 | 0.000000 | 1.000000 |
| 2 | 0.000000 | 10.000000 | 1.000000 |
| 3 | 0.000000 | 27.000000 | 1.000000 |

| Vignetting Factors | | | | | |
|---|---|---|---|---|---|
| # | VDX | VDY | VCX | VCY | VAN |
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |

| Wavelengths | 1 |
|---|---|
| Units | μm |

| # | Value | Weight |
|---|---|---|
| 1 | 0.550000 | 1.000000 |

TABLE 3-continued

SURFACE DATA SUMMARY:

| Surfaces | Type | Curvature Radius | Thickness | Glass | Diameter | Conic | |
|---|---|---|---|---|---|---|---|
| Object | STANDARD | Infinity | Infinity | | 0 | 0 | 2.8 |
| 1 | STANDARD | Infinity | 0.5 | | 2 | | 0 |
| Stop | STANDARD | Infinity | 0 | | 1.6 | | 0 |
| 3 | STANDARD | 2.524873 | 1.1 | 1.696800, 55.460000 | 3 | 0 | L1 |
| 4 | STANDARD | −3.770955 | 0.16 | | 3 | | 0 |
| 5 | EVENASPH | −2.112843 | 0.35 | 1.583000, 30.050000 | 3 | −1.01357 | L2 |
| 6 | STANDARD | 2.654284 | 0.7 | | 3 | | 0 |
| 7 | STANDARD | −10.79486 | 0.81 | 1.583000, 30.050000 | 3.4 | 0 | L3 |
| 8 | EVENASPH | −2.531731 | 0.2 | | 3.4 | | −3.68581 |
| 9 | STANDARD | 3.901448 | 1.21 | 1.583000, 30.050000 | 5.2 | 0 | L4 |
| 10 | EVENASPH | 5.719637 | 1.5 | | 5.2 | | −20.3353 |
| 11 | STANDARD | Infinity | 0.5 | 1.516800, 64.200000 | 5.2 | 0 | Glass |
| 12 Image | STANDARD | Infinity | | | 5.2 | | 0 |

SURFACE DATA DETAIL:

| | |
|---|---|
| Surface Object | STANDARD 2.8 |
| Surface 1 | STANDARD |
| Surface Stop | STANDARD |
| Surface 3 | STANDARD L1 |
| Aperture | Floating Aperture |
| Maximum Radius | 1.5 |
| Surface 4 | STANDARD |
| Aperture | Floating Aperture |
| Maximum Radius | 1.5 |
| Surface 5 | EVENASPH L2 |
| Coefficient on r2 | 0 |
| Coefficient on r4 | 0.00250152 |
| Coefficient on r6 | −0.000193495 |
| Coefficient on r8 | 0 |
| Coefficient on r10 | 0 |
| Coefficient on r12 | 0 |
| Coefficient on r14 | 0 |
| Coefficient on r16 | 0 |
| Aperture | Floating Aperture |
| Maximum Radius | 1.5 |
| Surface 6 | STANDARD |
| Aperture | Floating Aperture |
| Maximum Radius | 1.5 |
| Surface 7 | STANDARD L3 |
| Aperture | Floating Aperture |
| Maximum Radius | 1.7 |
| Surface 8 | EVENASPH |
| Coefficient on r2 | 0 |
| Coefficient on r4 | −0.00387959 |
| Coefficient on r6 | 0.00277573 |
| Coefficient on r8 | 0.000133673 |
| Coefficient on r10 | 3.64299e−005 |
| Coefficient on r12 | 0 |
| Coefficient on r14 | 0 |
| Coefficient on r16 | 0 |
| Aperture | Floating Aperture |
| Maximum Radius | 1.7 |
| Surface 9 | STANDARD L4 |
| Aperture | Floating Aperture |
| Maximum Radius | 2.6 |
| Surface 10 | EVENASPH |
| Coefficient on r2 | 0 |
| Coefficient on r4 | −0.0137242 |
| Coefficient on r6 | 0.00142977 |
| Coefficient on r8 | −0.000101171 |
| Coefficient on r10 | 1.64597e−006 |
| Coefficient on r12 | 0 |
| Coefficient on r14 | 0 |
| Coefficient on r16 | 0 |
| Aperture | Floating Aperture |
| Maximum Radius | 2.6 |
| Surface 11 | STANDARD Glass |
| Aperture | Floating Aperture |
| Maximum Radius | 2.6 |
| Surface 12 Image | STANDARD |

FIG. 17 is a sectional view showing only the circular optical system 114 in the photographing optical system 112 shown in FIG. 15.

As shown in FIG. 17, a numerical value example of the circular optical system 114 including the first reflective mirror 114a, the second reflective mirror 114b, the lens 114c, the lens 115a, the cover glass 115b and the like is as below [Table 4]. In FIG. 17, a surface is designated by a surface number of a reference sign Si (I=1 to 13).

<Numerical Value Example in Second Embodiment (Circular Optical System 114: Telephoto Lens)>

TABLE 4

| GENERAL LENS DATA | |
|---|---|
| Surfaces | 13 |
| Stop | 2 |
| System Aperture | Entrance Pupil Diameter = 16 |
| Glass Catalogs | SCHOTT |
| Ray Aiming | Off |
| Apodization | Uniform, Factor = 0.00000E+000 |
| Temperature (C.) | 2.00000E+001 |
| Pressure (ATM) | 1.00000E+000 |
| Adjust Index Data to Environment | Off |
| Effective Focal Length | 13.18049(in air at system temperature and pressure) |
| Effective Focal Length | 13.18049(in image space) |
| Back Focal Length | 0.05954598 |
| Total Track | 10.8 |
| in image space F# | 0.8237809 |
| Paraxial Working F# | 0.8237809 |
| Working F# | 0.7994582 |
| in image space NA | 0.5188624 |
| Object Space NA | 8e−010 |
| Stop Radius | 8 |
| Paraxial Image Height | 0.9216699 |
| Paraxial Magnification | 0 |
| Entrance Pupil Diameter | 16 |
| Entrance Pupil Position | 8 |
| Exit Pupil Diameter | 72.10137 |
| Exit Pupil Position | 59.45525 |
| Field Type | Angle (in degrees) |
| Maximum Radial Field | 4 |
| Primary Wavelength | 0.5875618 μm |
| Lens Units | Millimeters |
| Angular Magnification | −0.221904 |
| Fields | 6 |
| Field Type | Angle (in degrees) |

| # | X Value | Y Value | Weight |
|---|---|---|---|
| 1 | 0.000000 | 0.000000 | 1.000000 |
| 2 | 0.000000 | 1.000000 | 1.000000 |
| 3 | 0.000000 | 2.000000 | 1.000000 |
| 4 | 0.000000 | 3.000000 | 1.000000 |
| 5 | 0.000000 | 3.000000 | 0.000000 |
| 6 | 0.000000 | 4.000000 | 01.000000 |

| Vignetting Factors | | | | | |
|---|---|---|---|---|---|
| # | VDX | VDY | VCX | VCY | VAN |
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |
| 4 | 0.000000 | 0.000000 | 0.000000 | 0.000000 | 0.000000 |
| 5 | 0.000000 | 0.000000 | 0.000000 | 0.000000 | 0.000000 |
| 6 | 0.000000 | 0.000000 | 0.000000 | 0.000000 | 0.000000 |

| | Wavelengths | 3 |
|---|---|---|
| | Units | μm |

| # | Value | Weight |
|---|---|---|
| 1 | 0.486133 | 1.000000 |
| 2 | 0.587562 | 1.000000 |
| 3 | 0.656273 | 1.000000 |

| SURFACE DATA SUMMARY: | | | | | | |
|---|---|---|---|---|---|---|
| Surfaces | Type | Curvature Radius | Thickness | Glass | Diameter | Conic |
| Object | STANDARD | Infinity | Infinity | | 0 | 0 |
| 1 | STANDARD | Infinity | 8 | | 17.11883 | 0 |

TABLE 4-continued

| | | | | | | | |
|---|---|---|---|---|---|---|---|
| Stop | STANDARD | Infinity | 0 | | 16 | 0 | |
| 3 | STANDARD | Infinity | 2.8 | | 16 | 0 | |
| 4 | STANDARD | −37.69787 | 0 | MIRROR | 16.27126 | −2.783951 | |
| 5 | STANDARD | Infinity | −9.8 | | 16.87826 | 0 | |
| 6 | STANDARD | 549.2888 | 4.1 | MIRROR | 9.307526 | 13659.01 | |
| 7 | STANDARD | Infinity | 0 | | 5.943563 | 0 | |
| 8 | STANDARD | 24.47484 | 0.81 | 1.583000, 30.050000 | 6.4 | 0 | L3 |
| 9 | EVENASPH | 60.56264 | 0.2 | | 6.4 | 546.4789 | |
| 10 | STANDARD | 3.901448 | 1.21 | 1.583000, 30.050000 | 5.6 | 0 | L4 |
| 11 | EVENASPH | 5.719637 | 1.5 | | 5.6 | −20.3353 | |
| 12 | STANDARD | Infinity | 0.5 | 1.516800, 64.200000 | 5.2 | 0 | Glass |
| 13 Image | STANDARD | Infinity | 5.2 | | | 0 | |

SURFACE DATA DETAIL:

| | |
|---|---|
| Surface Object | STANDARD |
| Surface 1 | STANDARD |
| Aperture | Circular Aperture |
| Minimum Radius | 6 |
| Maximum Radius | 10 |
| Surface Stop | STANDARD |
| Aperture | Circular Aperture |
| Minimum Radius | 5 |
| Maximum Radius | 9 |
| Surface 3 | STANDARD |
| Surface 4 | STANDARD |
| Mirror Substrate | Curved, Thickness = 3.25425E−001 |
| Aperture | Circular Aperture |
| Minimum Radius | 4 |
| Maximum Radius | 9 |
| Surface 5 | STANDARD |
| Surface 6 | STANDARD |
| Mirror Substrate | Curved, Thickness = 1.86151E−001 |
| Aperture | Circular Aperture |
| Minimum Radius | 3 |
| Maximum Radius | 6 |
| Surface 7 | STANDARD |
| Aperture | Circular Aperture |
| Minimum Radius | 1.622247 |
| Maximum Radius | 6 |
| Surface 8 | STANDARD L3 |
| Aperture | Floating Aperture |
| Maximum Radius | 3.2 |
| Surface 9 | EVENASPH |
| Coefficient on r2 | 0 |
| Coefficient on r4 | −0.00207824 |
| Coefficient on r6 | 0.0017115516 |
| Coefficient on r8 | −0.0002973863 |
| Coefficient on r10 | 2.2547512e−005 |
| Coefficient on r12 | 0 |
| Coefficient on r14 | 0 |
| Coefficient on r16 | 0 |
| Aperture | Floating Aperture |
| Maximum Radius | 3.2 |
| Surface 10 | STANDARD L4 |
| Aperture | Floating Aperture |
| Maximum Radius | 2.8 |
| Surface 11 | EVENASPH |
| Coefficient on r2 | 0 |
| Coefficient on r4 | −0.0137242 |
| Coefficient on r6 | 0.00142977 |
| Coefficient on r8 | −0.000101171 |
| Coefficient on r10 | 1.64597e−006 |
| Coefficient on r12 | 0 |
| Coefficient on r14 | 0 |
| Coefficient on r16 | 0 |
| Aperture | Floating Aperture |
| Maximum Radius | 2.8 |
| Surface 12 | STANDARD Glass |
| Aperture | Floating Aperture |
| Maximum Radius | 2.6 |
| Surface 13 Image | STANDARD |

[Third Embodiment of Photographing Optical System]

FIG. 18 is a sectional view showing a third embodiment of the photographing optical system applied to the image pickup device 10.

A photographing optical system 212 includes a central optical system 213 at a central region thereof and a circular optical system 214 at an outer portion of the system 213 which are arranged along the same optical axis.

The central optical system 213 is a telephoto lens constituted by a first lens 213a, second lens 213b, and lens 215, and has an angle of view α.

The circular optical system 214 is a wide angle lens constituted by a lens 214a and lens 215, and has an angle of view β (β>α), which is a wide angle as compared with the central optical system 213. Here, the lens 215 is included in an optical system shared by both the central optical system 213 and the circular optical system 214.

The photographing optical system 212 in the third embodiment, as compared with photographing optical systems in the first and second embodiments, is different in that the reflective mirror is not used, and the central optical system 213 is a telephoto lens and the circular optical system 214 is a wide angle lens.

Examples of another embodiment of the image pickup device 10 include, for example, a mobile phone and smartphone having a camera functionality, PDA (Personal Digital Assistants), portable game console. Hereinafter, a description is given in detail using the smartphone as an example with reference to the drawings.

<Configuration of Smart Phone>

FIG. 19 shows an outer appearance of a smartphone 500 as another embodiment of the image pickup device 10. The smartphone 500 shown in FIG. 19 having a housing 502 shaped in a flat plate includes on one face of the housing 502 a display and input unit 520 in which a display panel 521 as a display unit and an operation panel 522 as an input unit are integrated. The housing 502 includes a speaker 531, microphone 532, operation unit 540, and camera unit 541. A configuration of the housing 502 is not limited thereto, and a configuration in which the display unit and the input unit are independent of each other may be used, and a configuration having a clamshell structure or a slide mechanism may be used, for example.

FIG. 20 is a block diagram showing a configuration of the smartphone 500 shown in FIG. 19. As shown in FIG. 20, included are as main components of the smartphone a radio communication unit 510, display and input unit 520, telephoning unit 530, operation unit 540, camera unit 541, storage unit 550, external input/output unit 560, GPS (Global Positioning System) reception unit 570, motion sensor unit 580, power supply unit 590, and main controller 501. The smartphone 500 has, as a main function, a radio communication function for carrying out mobile radio communication via a base station device BS and a mobile communication network NW.

The radio communication unit 510 carries out radio communication with the base station device BS included in the mobile communication network NW according to an instruction from the main controller 501. Such radio communication is used to transmit and receive various pieces of file data such as audio data, image data and the like, and e-mail data and the like and receive Web data, streaming data and the like.

The display and input unit 520 is a so-called touch panel which, by way of control by the main controller 501, displays and visually delivers to the user an image (still image and moving picture), text information and the like, as well as detects a user's operation on the displayed information, and includes the display panel 521 and the operation panel 522. When a generated 3D image is viewed, the display panel 521 is preferably a 3D display panel.

The display panel 521 uses a LCD (Liquid Crystal Display), an OELD (Organic Electro-Luminescence Display) and the like as a display device.

The operation panel 522, which is placed such that an image displayed on a display surface of the display panel 521 can be visually recognized, is a device for detecting one or more coordinates operated by a user's finger or a stylus. If the device like this is operated by a user's finger or a stylus, a detection signal generated due to the operation is output to the main controller 501. Subsequently, the main controller 501 detects an operated position (coordinates) on the display panel 521 on the basis of the received detection signal.

As shown in FIG. 19, the display panel 521 and operation panel 522 in the smartphone 500 are integrated to constitute the display and input unit 520, and the operation panel 522 is arranged in a manner to fully cover the display panel 521. In a case of using such an arrangement, the operation panel 522 may have a function to detect the user's operation also on an area outside the display panel 521. In other words, the operation panel 522 may have a detection area for an overlapping portion overlapped with the display panel 521 (hereinafter, referred to as a displayed area) and a detection area for a peripheral portion not overlapped with the display panel 521 other than the displayed area (hereinafter, referred to as a non-displayed area).

Note that a size of the displayed area and a size of the display panel 521 may completely match each other, but both sizes may not necessarily match. The operation panel 522 may have two sensitive areas of the peripheral portion and an inside portion other than the peripheral portion. Further, a width of the peripheral portion is appropriately designed depending on a size of the housing 502 and the like. Still further, examples of a position detection method used for the operation panel 522 include a matrix switch method, resistance film method, surface acoustic wave method, infrared ray method, electromagnetic induction method, electrostatic capacitance method and the like, any method of which may be used.

The telephoning unit 330 having the speaker 531 and the microphone 532 converts user voice input through the microphone 532 into the audio data processable by the main controller 501 to output to the main controller 501, and decodes audio data received by the radio communication unit 510 or the external input/output unit 560 to output from the speaker 531. As shown in FIG. 19, for example, the speaker 531 may be mounted on the same face as the display and input unit 520 is provided on, and the microphone 532 may be mounted on a lateral face of the housing 502.

The operation unit 540 which is a hardware key using a key switch and the like accepts an instruction from the user. For example, the operation unit 540 is mounted on a lower side or lower lateral face of the display unit on the housing 502 of the smartphone 500, and is a press-button type switch which is turned on when pressed down by a finger or the like and is brought into a turned-off state by a restoring force of a spring or the like when the finger is released.

The storage unit 550 stores a control program and control data for the main controller 501, address data having a name, telephone number and the like of the communication other end associated with each other, data of transmitted and received e-mail, Web data downloaded by way of Web browsing, and downloaded content data, and temporarily stores streaming data or the like. The storage unit 550 includes an internal storage unit 551 built in the smartphone and an external storage unit 552 having a detachable external memory slot. Each of the internal storage unit 551 and the external storage unit 552 included in the storage unit 550 is attained by use of a storage medium of a flash memory type, hard disk type, multimedia card micro type, card type memory (e.g., Micro SD (registered trademark) memory, etc.), RAM (Random Access Memory), ROM (Read Only Memory), and the like.

The external input/output unit 560 serves as an interface with all external devices coupled to the smartphone 500 to allow other external devices to be directly or indirectly connected with the smartphone 500 via a communication or the like (e.g., Universal Serial Bus (USB), IEEE1394, etc.) or network (e.g., Internet, wireless LAN, Bluetooth (registered trademark), RFID (Radio Frequency Identification), IrDA (Infrared Data Association) (registered trademark), UWB (Ultra Wideband) (registered trademark), ZigBee (registered trademark), etc.).

Examples of the external device coupled to the smartphone 500 include, for example, a wired/wireless head set, wired/wireless external charger, wired/wireless data port, memory card or SIM (Subscriber Identity Module Card)/UIM (User Identity Module Card) card connected via a card socket, external audio and video device connected via an audio and video I/O (Input/Output) terminal, external audio and video device wirelessly connected, smartphone via a wired/wireless connection, personal computer via a wired/wireless connection, PDA via a wired/wireless connection, personal computer via a wired/wireless connection, earphone, and the like. The external input/output unit can deliver data received by way of transmission from such an external device above to the respective components in the smartphone 500 and transmit the data in the smartphone 500 to the external devices.

The GPS reception unit 570 receives GPS signals transmitted from GPS satellites ST1 to STn to perform positioning arithmetic processing on the basis of the received plural GPS signals according to an instruction from the main controller 501, and detects a position including latitude, longitude, and altitude of the smartphone 500. When positional information can be acquired from the radio communication unit 510 or the external input/output unit 560 (e.g., wireless LAN), the GPS reception unit 570 may use the positional information to detect the position.

The motion sensor unit 580 which includes, for example, a triaxial acceleration sensor or the like detects physical motion of the smartphone 500 according to an instruction from the main controller 501. Detection of the physical motion of the smartphone 500 allows a direction or acceleration of the motion of the smartphone 500 to be detected. A result of the detection is to be output to the main controller 501.

The power supply unit 590 supplies electrical power stored in a battery (not shown) to each unit of the smartphone 500 according to an instruction from the main controller 501.

The main controller 501 which includes a microprocessor operates according to the control program or control data stored in the storage unit 550 and collectively controls the respective units of the smartphone 500. The main controller 501 has a mobile communication controlling function to control each unit in a communication system and an application processing function in order to perform audio communication or data communication via the radio communication unit 510.

The application processing function is attained by the main controller 501 operating according to the application software stored in the storage unit 550. Examples of the application processing function include, for example, an infrared communication function to control the external input/output unit 560 to perform the data communication with an opposite device, e-mail function to transmit and receive an e-mail, Web browsing function to view a Web page, and the like.

The main controller 501 has an image processing function to display a video on the display and input unit 520 and so forth on the basis of the image data such as the received data or downloaded streaming data (data of still image and moving image). The image processing function refers to a function that the main controller 501 decodes the above image data and subjects a result of decoding to image processing to display the image on the display and input unit 520.

Further, the main controller 501 performs display control of the display panel 521 and operation detecting control to detect the user's operation input via the operation unit 540 and the operation panel 522.

The main controller 501 performs the display control to display an icon for starting the application software or a software key such as a scroll bar, or display a window for creating an e-mail. Note the scroll bar refers to a software key for accepting an instruction to move a displayed portion of an image such as a large image not entirely accommodated within the displayed area of the display panel 521.

The main controller 501 performs the operation detecting control to detect the user's operation input via the operation unit 540, accepts via the operation panel 522 an operation on the above icon or an input of a character string to an input field in the above window, or accepts a request input via the scroll bar for scrolling of the displayed image.

Further, the main controller 501 has a touch panel controlling function to perform the operation detecting control to determine whether an operated position on the operation panel 522 is the overlapping portion (displayed area) overlapped with the display panel 521 or the peripheral portion (non-displayed area) not overlapped with the display panel 521 other than the overlapping portion, and control the sensitive area of the operation panel 522 or a displayed position of the software key.

The main controller 501 can also detect a gesture operation on the operation panel 522 and perform a predetermined function depending on the detected gesture operation. Instead of a simple touch operation of related art, the gesture operation means an operation including tracking by a finger or the like, simultaneously specifying a plurality of positions, or combining these operations to track from at least one of a plurality of positions.

The camera unit 541 is a digital camera electronically imaging by use of the image pickup device such as a CMOS (Complementary Metal Oxide Semiconductor) or a CCD (Charge-Coupled Device). The image pickup device 10 described above can be applied to the camera unit 541. The image pickup device 10 can capture the wide angle image and the telephoto image with no need for the mechanically switching mechanism or the like, and thus, is preferably used as the camera unit which is built in a thin portable terminal like the smartphone 500.

The camera unit 541 can under the control by the main controller 501 convert the image data obtained by capturing an image into a compressed image data such as JPEG (Joint Photographic coding Experts Group), for example, to store in the storage unit 550 and output via the input/output unit 560 or the radio communication unit 510. In the smartphone 500 shown in FIG. 19, the camera unit 541 is mounted on the same face as the display and input unit 520, but, a mounted position of the camera unit 541 being not limited thereto, may be mounted on a rear face of the display and input unit 520, or a plurality of camera units 541 may be mounted. In the case where a plurality of camera units 541 are mounted, the camera unit 541 for imaging may be changed over for singularly imaging, or a plurality of camera units 541 may be simultaneously used for imaging.

The camera unit 541 can be used for the various functions of the smartphone 500. For example, an image obtained by the camera unit 541 may be displayed on the display panel 521, or an image of the camera unit 541 may be used as one of operation input on the operation panel 522. When the GPS reception unit 570 detects a position, the position can be detected by referring an image from the camera unit 541. Further, by referring an image from the camera unit 541, without using the triaxial acceleration sensor or in combination with the triaxial acceleration sensor, an optical axis direction of the camera unit 541 of the smartphone 500 can be determined, and also a current usage environment can be determined. Of course, an image from the camera unit 541 may be used in the application software.

[Others]

The reflective mirror in the reflective mirror type lens configuration in the first and second embodiments of the photographing optical system is not limited to a concave mirror and a convex mirror, but may be a planar mirror, and the number of the reflective mirrors is not limited to two, but three or more reflective mirrors may be provided.

In the photographing optical systems in the embodiments, the wide angle lens is used for one of the central optical system and the circular optical system and the telephoto lens is used for the other, but, not limited thereto, one of the wide angle lens and the telephoto lens may be a normal lens, and further, the central optical system and two circular optical systems having a diameter different from each other may be disposed to give the wide angle lens, the normal lens, and the telephoto lens to the respective optical systems.

As the pupil division device for making the directional sensor have pupil directivity, not limited to the pupil image separation method and light shielding mask method shown in FIG. 6, but those using a pupil division polarization element and the like may be applied.

Further, a lens shared by the central optical system and the circular optical system or a movement mechanism for moving the directional sensor in the optical axis direction may be disposed to carry out focusing thereby.

It goes without saying that the present invention is not limited to the embodiments described above and may be modified in the scope without departing from the spirit of the invention.

What is claimed is:

1. An image pickup device comprising:
a photographing optical system having a central optical system disposed at a central region and a circular optical system disposed at an outer portion of the central optical system which are arranged along the same optical axis;
a directional sensor having plural pixels including two-dimensionally arranged photoelectric conversion elements, the directional sensor including plural pixels for selectively receiving light beams of light fluxes which are incident via the central optical system and the circular optical system by applying pupil division; and
an image readout device that acquires from the directional sensor each of an image signal representing a first image received via the central optical system and an image signal representing a second image received via the circular optical system,
wherein the directional sensor having directional characteristics depending on pupil shapes of the central optical system and the circular optical system at an image surface position is used,
wherein the directional sensor has a microlens serving as a pupil division device, the microlens dividing a pupil image and each divided pupil image entering the pixel, and the number of the pixels allocated to one microlens decreases as an image height increases.

2. The image pickup device according to claim 1, wherein a size of each pixel in the directional sensor is identical, and a size of the microlens used decreases as the image height increases.

3. The image pickup device according to claim 1, wherein a size of the microlens is identical, and a size of the pixel in the directional sensor increases as the image height increases.

4. The image pickup device according to claim 2, wherein the central optical system has larger image forming magnification at the central region and smaller image forming magnification at a periphery side.

5. The image pickup device according to claim 2, wherein the circular optical system has smaller image forming magnification on an inner diameter side and larger image forming magnification on an outer diameter side.

6. The image pickup device according to claim 1, wherein the directional sensor has a light shielding mask serving as a pupil division device, and the light shielding mask having an opening shape depending on pupil shapes of the central optical system and the circular optical system at an image surface position is used.

7. An image pickup device comprising:
a photographing optical system having a central optical system disposed at a central region and a circular optical system disposed at an outer portion of the central optical system which are arranged along the same optical axis;
a directional sensor having plural pixels including two-dimensionally arranged photoelectric conversion elements, the directional sensor including plural pixels for selectively receiving light beams of light fluxes which are incident via the central optical system and the circular optical system by applying pupil division; and
an image readout device that acquires from the directional sensor each of an image signal representing a first image received via the central optical system and an image signal representing a second image received via the circular optical system, wherein
a first image circle for the central optical system is different from a second image circle for the circular optical system, and
the directional sensor has the pixel for selectively receiving light by applying the pupil division disposed at only a region where the first image circle and the second image circle overlap one another.

8. The image pickup device according to claim 1, wherein the central optical system has wider angle as compared with the circular optical system.

9. An image pickup device comprising:
a photographing optical system having a central optical system disposed at a central region and a circular optical system disposed at an outer portion of the central optical system which are arranged along the same optical axis;

a directional sensor having plural pixels including two-dimensionally arranged photoelectric conversion elements, the directional sensor including plural pixels for selectively receiving light beams of light fluxes which are incident via the central optical system and the circular optical system by applying pupil division; and an image readout device that acquires from the directional sensor each of an image signal representing a first image received via the central optical system and an image signal representing a second image received via the circular optical system, wherein the central optical system has wider angle as compared with the circular optical system, wherein the circular optical system has a catoptric system for reflecting the light flux two or more times.

10. The image pickup device according to claim 9, wherein the directional sensor is positioned on an object side with respect to the catoptric system which first reflects the light flux.

11. The image pickup device according to claim 1, wherein the central optical system and the circular optical system share a part of the optical system.

12. The image pickup device according to claim 1, comprising a mode switcher that switches between a first imaging mode and a second imaging mode different in a focal length from each other, wherein the image readout device acquires from the directional sensor the image signal representing the first image obtained by receiving light via the central optical system when the mode switcher switches to the first imaging mode, and acquires from the directional sensor the image signal representing the second image obtained by receiving light via the circular optical system when the mode switcher switches to the second imaging mode.

13. The image pickup device according to claim 12, wherein the mode switcher has a switching function to switch to a hybrid imaging mode for performing two kinds of imaging different in the focal length, and the image readout device simultaneously acquires from the directional sensor the image signal representing the first image obtained by receiving light via the central optical system and the image signal representing the second image obtained by receiving light via the circular optical system when the mode switcher switches to the hybrid imaging mode.

* * * * *